United States Patent
Boatner

(10) Patent No.: US 7,677,862 B2
(45) Date of Patent: Mar. 16, 2010

(54) VERTICAL AXIS WIND TURBINE WITH ARTICULATING ROTOR

(76) Inventor: Bruce E. Boatner, 1212 E. Riversong Dr., Eagle, ID (US) 83616

( * ) Notice: Subject to any disclaimer, the term of this patent is extended or adjusted under 35 U.S.C. 154(b) by 698 days.

(21) Appl. No.: 11/635,308

(22) Filed: Dec. 7, 2006

(65) Prior Publication Data

US 2008/0095608 A1 Apr. 24, 2008

Related U.S. Application Data

(63) Continuation-in-part of application No. 11/501,088, filed on Aug. 7, 2006, now abandoned.

(51) Int. Cl.
F03D 7/06 (2006.01)
(52) U.S. Cl. .......................... 415/4.2; 415/907; 416/144
(58) Field of Classification Search ................. 415/4.2, 415/4.4, 907; 416/110, 111, 117, 118, 132 R, 416/132 B, 148
See application file for complete search history.

(56) References Cited

U.S. PATENT DOCUMENTS

| | | | |
|---|---|---|---|
| 226,357 A | 4/1880 | Saccone | |
| 232,205 A | 9/1880 | Preston | |
| 237,851 A * | 2/1881 | Foskett | ........................ 416/80 |
| 1,800,470 A * | 4/1931 | Oehmichen | ................... 416/40 |
| 1,835,018 A | 12/1931 | Darrieus | |
| 2,038,467 A | 4/1936 | Zanoski | |
| 2,465,285 A * | 3/1949 | Schwickerath | ................ 416/41 |
| 2,481,750 A | 9/1949 | Hiller et al. | |
| 4,087,202 A * | 5/1978 | Musgrove | ..................... 416/41 |
| 4,184,084 A | 1/1980 | Crehore | |
| 4,299,537 A | 11/1981 | Evans | |
| 4,383,801 A | 5/1983 | Pryor | |
| 4,408,956 A | 10/1983 | Price, Sr. | |
| 4,415,312 A | 11/1983 | Brenneman | |
| 4,474,529 A | 10/1984 | Kinsey | |
| D300,932 S | 5/1989 | Sikes | |
| 6,320,273 B1 | 11/2001 | Nemec | |
| 6,402,472 B1 * | 6/2002 | Hogue et al. | ............. 416/132 A |
| 6,543,999 B1 * | 4/2003 | Polen | ........................... 416/17 |
| 6,688,842 B2 | 2/2004 | Boatner | |
| 6,749,394 B2 | 6/2004 | Boatner | |
| 7,118,341 B2 * | 10/2006 | Hartman | ....................... 416/17 |

* cited by examiner

*Primary Examiner*—Edward Look
*Assistant Examiner*—Ryan H Ellis
(74) *Attorney, Agent, or Firm*—Loyal McKinley Hanson

(57) ABSTRACT

A VAWT wind engine includes a support structure, an articulating rotor mounted on the support structure for rotation about a vertically extending axis, and at least one airfoil on the rotor for rotor-powering purposes. The articulating rotor is mounted in a manner enabling tilting movement of the rotor during rotation so that the airfoil produces rotor rotation and rotor tilt as the airfoil orbits the rotational axis. At least one mechanical linkage is included to actively vary airfoil pitch according to rotor tilt. The partially articulating rotor of a teetering-rotor embodiment seesaws up and down about a horizontally extending pivotal axis. The fully articulating rotor of another embodiment supports three airfoils as it tilts in any direction by virtue of a gimbal or other rotor hub assembly providing a 360-degree swiveling action, while furling hinges help protect the airfoils against damaging winds during wind engine shutdown.

22 Claims, 19 Drawing Sheets

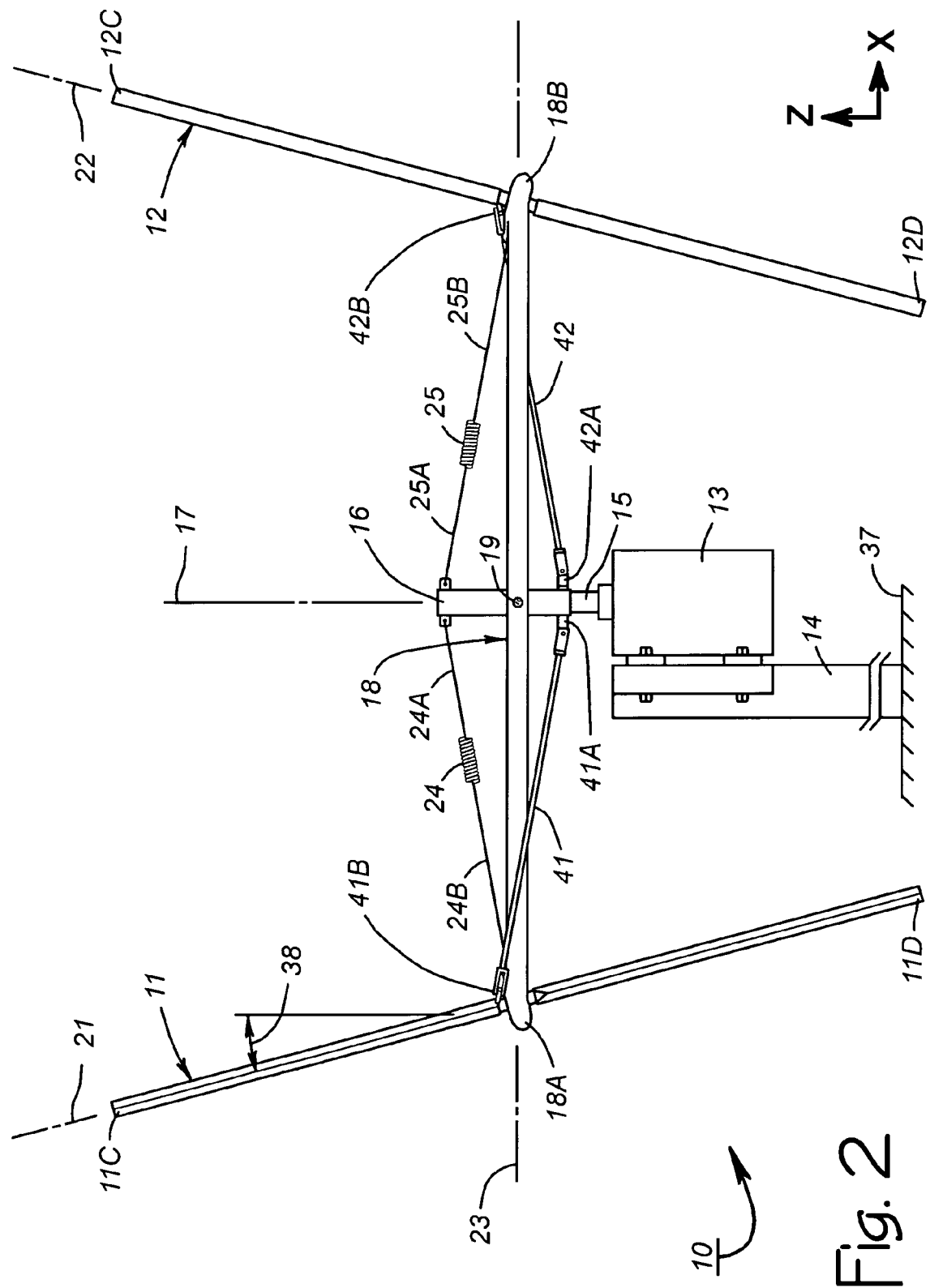

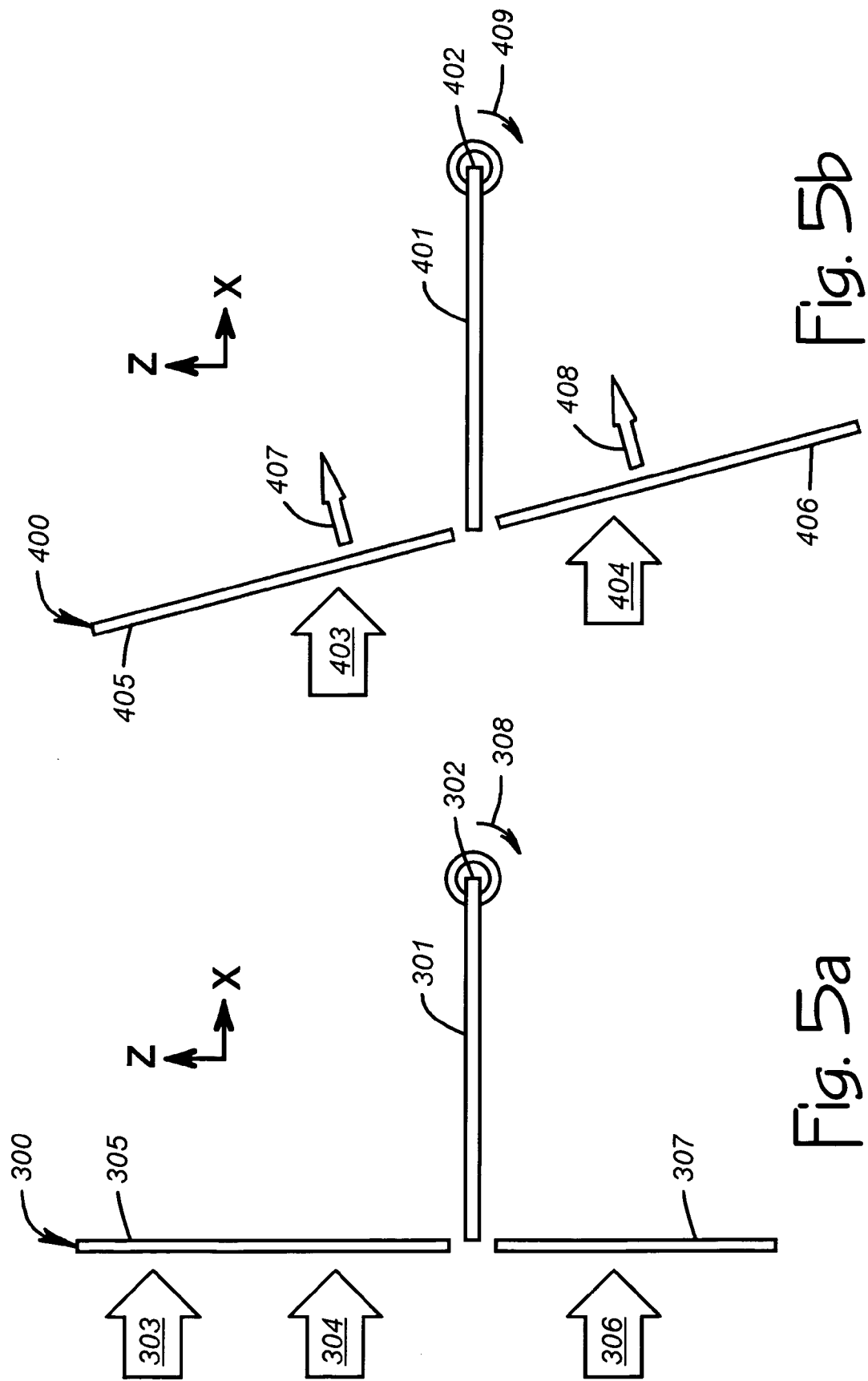

VERTICAL AXIS WIND TURBINE WITH ARTICULATING ROTOR

CROSS REFERENCE TO RELATED APPLICATION

This application is a continuation in part of copending U.S. patent application Ser. No. 11/501,088 filed on Aug. 7, 2006.

BACKGROUND OF THE INVENTION

1. Technical Field

This invention relates generally to wind turbines and the like, and more particularly to a vertical axis wind turbine that utilizes the kinetic energy of moving air to provide rotational energy useable for generating electric power and/or other useful purposes.

2. Description of Related Art

The goal of any wind turbine is to extract power from the wind. In 1919 Albert Betz theorized that the efficiency limit for wind energy conversion is 59.3% and emphasized that since energy is derived from the movement of air molecules, one should avoid slowing the incoming air mass by more than about one-third. Based on the work of Betz, wind turbine technology has evolved toward the use of a minimum number of airfoils traveling at a maximum practical speed, in an attempt to create a virtual two-dimensional surface area through which the passing wind energy can be extracted.

An existing wind turbine usually takes the form of a horizontal axis wind turbine (HAWT) or a vertical axis wind turbine (VAWT). Due largely to Betz, wind energy research has tended to focus on HAWTs because issues pertaining to efficiency, such as blade-tip speed and airfoil design, are more relevant to propeller-type HAWT designs than to VAWT designs, which are sometimes viewed as little more than novelties. Many VAWT designs today still operate in drag mode, deriving torque by exploiting drag in the downwind phase of the cycle while attempting to minimize drag on the upwind leg, an approach that can be traced back in time to caged-rotor VAWTs and other such panemones.

Attempts to modernize VAWTs by incorporating lift-thrust have produced a class of machines called giromills and cyclo-turbines (i.e., VAWTs operating in lift mode). VAWTs operating in lift mode fall into three major subcategories. The first subcategory, fixed-pitch VAWTs, includes those having fixed airfoils (e.g., the Darrieus machine described in U.S. Pat. No. 1,835,018). The second, self-orienting-pitch VAWTs, includes those using reactive elements that orient themselves relative to the wind without a separate control means (less-than-ideal angle-of-attack due to the delay inherent in repositioning the airfoil reactive elements in response to the same relative wind from which they derive their motive lift). The third, mechanically-controlled-pitch VAWTs, are those that utilize variable pitch controlled by mechanical methods. There are also aspects of variable geometry in each subcategory, used for both performance considerations and over speed and high wind protection, sometimes referred to as furling.

With further regard to the Darrieus patent mentioned above (U.S. Pat. No. 1,835,018), it describes a method of cyclical pitch control of airfoils using a shifting central rotor post, and then proceeds to demonstrate that mechanical pitch variation can be abandoned if properly shaped airfoils are accelerated to velocities well above local wind speeds. Doing so creates relative winds that continuously impinge favorably on the airfoil surfaces, creating lift. The cost of this simplification, however, is the loss of a self-starting capability. Nevertheless, the Darrieus patent and its theoretical basis have formed an important foundation for much of VAWT technology and research that followed.

The VAWT described in U.S. Pat. No. 4,299,537 (i.e., the Evans patent) also sets the cyclical pitch angles of the airfoils without any external orienting means. It does so by allowing the wind to act on all airfoils simultaneously to produce the airfoil positions independently. Essentially, the system as a whole acts as the orienting mechanism for the individual airfoils. It accomplishes wind-direction sensing and airfoil-pitch control without external orientation mechanisms.

The VAWT described in U.S. Pat. No. 6,320,273 (i.e., the Nemec patent) illustrates an existing method of using an external device to position a pitch control mechanism in relation to the wind. Typically, an offset crank is oriented upwind or downwind of the principal axis of rotation and the individual airfoils set their angle-of-attack based on cyclical positioning relative to the hub and crank assembly. The Nemec patent emphasizes that in order to obtain optimal lift at all times, it is necessary to maintain a constant angle-of-attack of from four to ten degrees as the relative wind varies with rotor speed.

The helicopter described in U.S. Pat. No. 2,481,750 (i.e., the Hiller patent) uses a "Rotormatic" control system such that the tilt angle of the swashplate is controlled directly by the pilot's cyclic input. The swashplate in turn controls the flybar, a system of two lightweight symmetrical airfoils attached to a teetering bar oriented perpendicularly to the axis of the main rotor blades, and the flybar in turn controls the pitch of the main rotor blades. On receiving pitch changes to its paddles, the flybar responds by attempting to fly the new plane established by the swashplate. Because the pitch of the main rotor blades is controlled by the flybar, response of the flybar to the new control orientation is delayed. Eventually, the main rotor and the flybar reach equilibrium in the new rotational plane established by the swashplate.

Thus, the prior art has progressed to the use of airfoils in lift-based VAWT designs, with U.S. Pat. Nos. 6,688,842 and 6,749,394 providing additional related information. Nevertheless, the design of a suitable mechanically-controlled-pitch VAWT for power-generating purposes remains elusive despite the potential significant advantages of such a VAWT, including: (i) VAWTs do not require alignment with the windstream as does an HAWT, (ii) VAWT drive train components can be located at ground level instead of being mounted higher above ground at HAWT rotor level, (iii) VAWTs can have aesthetically more pleasing appearances, and (iv) a VAWT with a mechanically-controlled-pitch arrangement could avoid the less-than-ideal angle-of-attack and self-starting inefficiencies of self-positioning and fixed-pitch VAWTs. For these and other reasons, there exists a need for VAWT improvements.

SUMMARY OF THE INVENTION

This invention addresses the need outlined above by providing a vertical axis wind turbine (VAWT) having an articulating rotor system for mechanical control of airfoil angle-of-attack (i.e., pitch) based directly on rotor tilt. The VAWT includes a rotor that is mounted on a central support structure for rotation about a vertically extending rotational axis, with the rotor being an articulating rotor in the sense that it is mounted on the support structure in a manner enabling rotor tilt during rotor rotation. The articulating rotor supports one or more wind-reactive airfoils so that wind-derived airfoil forces produce both rotor rotation and rotor tilt, with rotor tilt causing mechanical linkages to actively vary airfoil pitch.

The partially articulating "teetering rotor" of one embodiment seesaws up and down about a horizontally extending pivotal axis as it rotates. The fully articulating "360-degree articulating rotor" of another embodiment teeters (i.e., tilts) in any direction as it rotates by virtue of a gimbal or other rotor mounting means providing a 360-degree swiveling action.

To paraphrase some of the more precise language appearing in the claims and further introduce the nomenclature used, a wind engine constructed according to the broader aspect of the invention (e.g., a VAWT) includes a support structure, a rotor mounted on the support structure for rotational movement about a vertically extending rotational axis, and rotor-powering means responsive to oncoming wind for causing the rotor to rotate about the rotational axis, including at least a first airfoil on the rotor. According to the broader aspect of the invention, the rotor is mounted on the support structure in a manner enabling tilting movement of the rotor in response to wind-derived airfoil forces (i.e., it is an articulating rotor) and the wind engine includes pitch-varying means (i.e., at least one mechanical linkage) for varying a pitch of the first airfoil in response to tilting movement of the rotor. Wind-derived airfoil forces cause the rotor to tilt as it rotates, with the mechanical linkage functioning to vary airfoil pitch accordingly.

A wind engine constructed according to the partially articulating teetering-rotor aspect of the invention includes a support structure and a rotor mounted on the support structure in a manner enabling only partial articulation for rotor tilting purposes. In other words, the rotor (i.e., a teetering rotor) is mounted on the support structure for rotational movement about a vertically extending rotational axis and pivotal movement about a horizontally extending pivotal axis. The teetering rotor includes first and second mounting portions disposed radially outward in diametrically opposite positions relative to the rotational axis, along with a rotor axis that intersects the rotational axis and passes through the first and second mounting portions of the teetering rotor.

At least one airfoil (i.e., a first airfoil) is provided. It is mounted on the first mounting portion of the teetering rotor where it serves as first rotor-powering means responsive to oncoming wind for causing the teetering rotor to rotate about the rotational axis and pivot about the pivotal axis. The first airfoil includes a first longitudinally extending axis and it is mounted on the first mounting portion of the teetering rotor with the longitudinally extending axis intersecting the rotor axis. First and second centering/limiting springs are also provided, extending between a mast portion of the support structure and respective ones of the first and second mounting portions of the teetering rotor where they serve as means for spring biasing the teetering rotor in a horizontally extending position and for limiting pivotal motion of the teetering rotor.

A first mechanical linkage couples (i.e., links) the first airfoil to the support structure. It functions as first pitch-varying means for varying the pitch of the first airfoil according to variations in the alignment of the first airfoil with the oncoming wind as the first airfoil orbits the rotational axis. The first mechanical linkage is adapted to vary the pitch of the first airfoil in response to the first airfoil moving upwardly and downwardly with the first mounting portion of the teetering rotor as the first airfoil orbits the rotational axis. Preferably, a safety release is included for disengaging the first mechanical linkage from the first airfoil when the first airfoil rotates beyond a predetermined limit (e.g., from operation in high winds).

One teetering-rotor embodiment of the invention includes a single airfoil mounted on the first mounting portion of the teetering rotor, with a counterbalancing weight being mounted on the second mounting portion. A first longitudinally extending axis of that airfoil is perpendicular to the rotor axis. Another teetering-rotor embodiment of the invention includes a second airfoil mounted on the second mounting portion of the teetering rotor, along with second pitch-varying means for varying its pitch. The first and second airfoils are canted relative to the vertically extending rotational axis. In other words, their first and second longitudinally extending axes are not perpendicular to the rotor axis. They diverge upwardly and converge downwardly, although they are seen to converge upwardly and diverge downwardly for yet another embodiment.

A wind engine constructed according to the fully articulating rotor aspect of the invention also includes a support structure and a rotor mounted on the support structure for rotation about a vertically extending rotational axis. However, the rotor is mounted in a manner enabling full 360-degree articulation for rotor tilting purposes. In other words, the rotor includes and is mounted with a rotor hub assembly that provides a 360-swiveling action (i.e., full 360-degree articulation), thereby enabling rotor tilt in any direction. The illustrated 360-degree articulating rotor is implemented with a gimbaled rotor mounting, and it supports three airfoils in circumferentially spaced-apart positions so that there is always at least one airfoil at or near its optimal power position relative to the oncoming wind. In addition, airfoil furling components are included to help protect against damaging winds.

Thus, the invention provides a VAWT having an articulating rotor system for mechanical control of airfoil angle-of-attack based directly on rotor tilt. Wind-reactive airfoils are supported by the articulating rotor system for rotation about a vertically extending axis of rotation so that wind-derived airfoil forces produce rotor rotation and rotor tilt, with rotor tilt causing mechanical linkages to actively vary airfoil pitch during rotation. The following illustrative drawings and detailed description make the foregoing and other objects, features, and advantages of the invention more apparent.

BRIEF DESCRIPTION OF THE DRAWINGS

FIG. 2 of the drawings is an elevation view of the partially articulating VAWT embodiment, showing further details of the canting airfoils;

FIG. 4b is an enlarged view of a portion of the VAWT illustrated in FIG. 4a;

FIG. 5a is a diagrammatic representation illustrating wind-derived, rotor-tilting forces of a perpendicularly mounted airfoil;

FIG. 5b is a diagrammatic representation illustrating wind-derived, rotor-tilting forces of a canted airfoil;

DESCRIPTION OF THE PREFERRED EMBODIMENTS

Figure 1A:
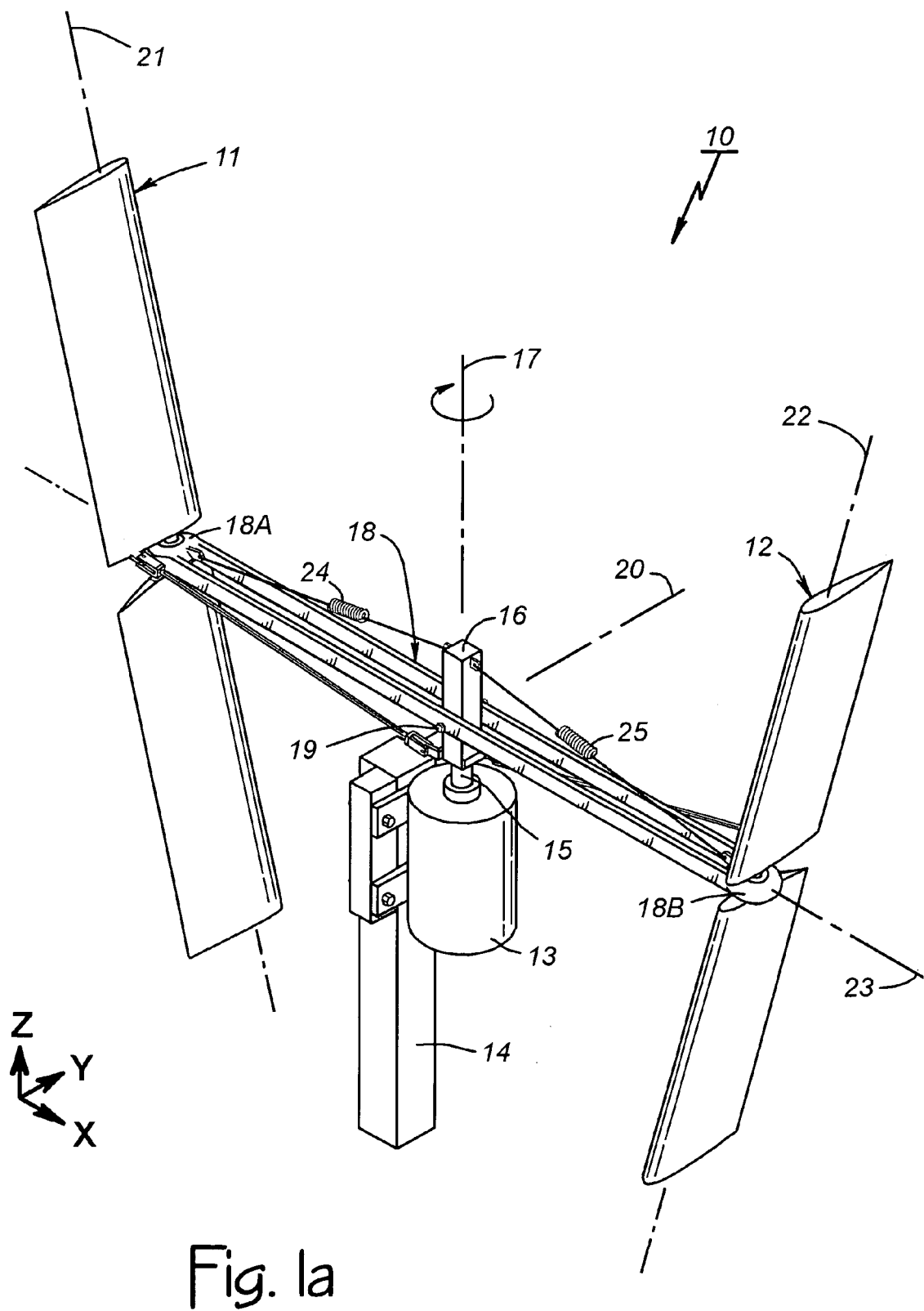
FIG. 1a of the drawings is a perspective view of a first articulating VAWT embodiment that is constructed according to the partially articulating teetering-rotor aspect of the invention.

First Partially Articulating Embodiment. FIG. 1a of the drawings is a perspective view of a vertical axis wind turbine (i.e., a wind engine) constructed according to the invention. It is identified as a VAWT 10 and it operates in lift mode with mechanically-controlled-pitch and fixed geometry. Generally, the VAWT 10 includes first and second airfoils 11 and 12 that respond to oncoming wind to power a load 13 (e.g., a gear box coupled to a generator that produces electrical power). The load 13 is part of a support structure 14 that includes the load 13, a drive shaft 15 connected to the load 13, and a vertically extending mast 16 connected to the drive shaft 15 for rotation with the drive shaft 15 as a vertically extending support structure extension. The airfoils 11 and 12 cause the mast 16, and thereby the drive shaft 15, to rotate about a vertically extending axis of rotation 17 in response to oncoming wind, doing so with a teetering rotor 18.

The airfoils 11 and 12 are canted relative to the rotor 18, with wind-derived airfoil forces causing the rotor 18 to teeter-totter as the rotor rotates and the airfoils 11 and 12 pass through various phases relative to oncoming wind. The rotor 18 teeter-totters in the sense that it pivots on an axle 19 about a horizontally extending pivotal axis 20 that is perpendicular to the vertically extending rotational axis 17. The rotor 18 tilts upwardly and downwardly. In other words, the rotor 18 moves with an alternating up-and-down motion that is similar in some respects to the motion of a teeter-totter (i.e., a seesaw).

Notice that an X-Y-Z coordinate system is shown in FIG. 1a for spacial reference purposes, with the orthogonal X and Y-axes defining a horizontal X-Y plane to which the Z-axis is perpendicular. As used herein, the term "vertically extending" includes exactly vertical (i.e., exactly parallel to the Z-axis) and approximately vertical (i.e., approximately parallel to the Z-axis), while the term "horizontally extending" includes exactly horizontal (i.e., exactly parallel to the X-Y plane) and approximately horizontal (i.e., approximately parallel to the X-Y plane). Similarly, the term "perpendicular" includes exactly perpendicular and at least approximately perpendicular.

The cyclical teeter-totter action of the rotor 18 described above controls airfoil pitch mechanically by rotating the airfoils 11 and 12 about their longitudinally extending axes (i.e., first and second longitudinally extending airfoil axes 21 and 22 that intersect a rotor axis 23 or the rotor 18) as the airfoils 11 and 12 move through varying phases of alignment with oncoming wind. In terms of the rotor axis 23, the position of the rotor axis 23 moves pivotally in a seesaw fashion relative to the horizontal X-Y plane as the rotor 18 rotates and teeter-totters. The rotor 18 moves from a first position inclined toward the first airfoil 11 that represents a downward tilt of the rotor 18 relative to the airfoil 11 (i.e., a downward rotor tilt angle), to a second or normal position that is horizontal (i.e., parallel to the X-Y plane), then to a third position inclined toward the second airfoil 12 that represents an upward tilt of the rotor 18 relative to the first airfoil 11 (i.e., an upward rotor tilt angle), and from there back to the second position and then once again to the first position to start the cycle again.

First and second springs 24 and 25 (centering springs) spring bias the rotor 18 toward the second (horizontal) position of the rotor axis 23. The springs 24 and 25 also serve as means for limiting the pivotal excursion of the rotor 18 (i.e., how far the rotor 18 can pivot about the pivotal axis 20 from a neutral horizontal extending position). In calm wind conditions (i.e., very little or no wind), the springs 24 and 25 maintain the rotor 18 horizontally disposed (i.e., in a horizontally disposed, neutral position with the rotor axis 23 at least approximately parallel to the X-Y plane); in high wind conditions, they limit rotor pivotal motion from that horizontally disposed position. The first and second springs 24 and 25 are connected by cables or other suitable means to the mast 16, and thereby to the rest of the support structure 14; they are also connected by cables or other suitable means to respective ones of outwardly disposed first and second mounting portions 18A and 18B of the rotor 18, although they can be attached anywhere along the rotor. In that regard, the rotor extends radially from the rotational axis 17 to the first and second mounting portions 18A and 18B of the rotor 18 so that the first and second mounting portions of the rotor 18 are outwardly disposed in the sense that they are spaced radially outward from the rotational axis 17.

Figure 1B:
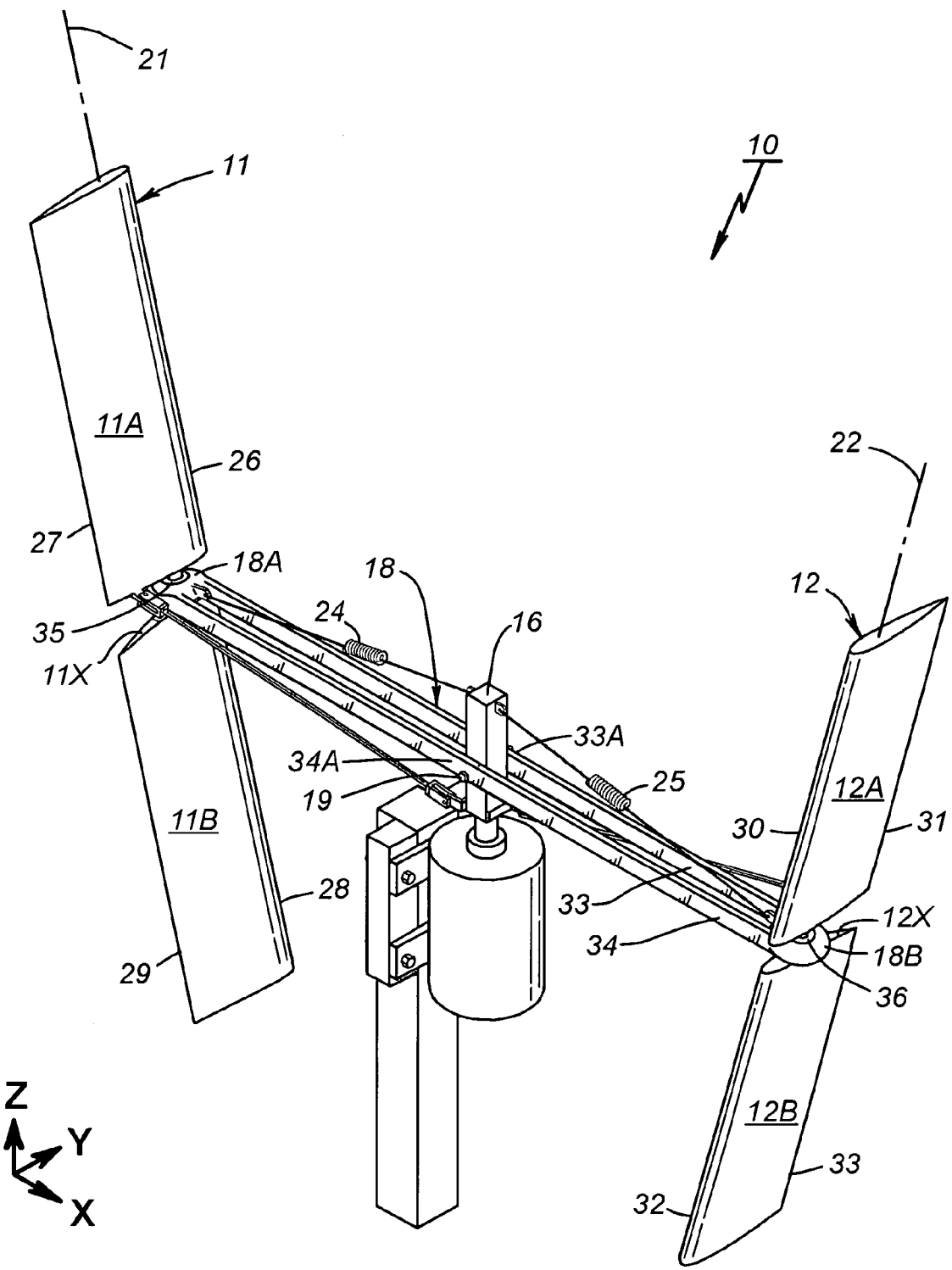
FIG. 1b of the drawings is a perspective view similar to FIG. 1a that includes additional reference numerals which are omitted from FIG. 1a to improve illustrative clarity.

Further details of the construction and nomenclature used for the VAWT 10 and its teetering rotor 18 are described with reference to FIG. 1b. The first and second airfoils 11 and 12 of the illustrated VAWT 10 are segmented, although they need not be within the broader inventive concepts disclosed. Thus, the illustrated first airfoil 11 includes a first upper segment 11A and a first lower segment 11B that are connected together to rotate together (in fixed alignment with each other) about the longitudinally extending axis 21. Similarly, the illustrated second airfoil 12 includes an upper segment 12A and a second lower segment 12B that are connected together to rotate together (in fixed alignment with each other) about the longitudinally extending axis 22. The first upper segment 11A has a leading edge 26 and a trailing edge 27, the first lower segment 11B has a leading edge 28 and a trailing edge 29, and the combination of the leading edges 26 and 28 forms a leading edge of the first airfoil 11 while the combination of the trailing edges 27 and 29 forms a trailing edge of the first airfoil 11. Similarly, the second upper segment 12A has a leading edge 30 and a trailing edge 31, the second lower segment 12B has a leading edge 32 and a trailing edge 33, and the combination of the leading edges 30 and 31 forms a leading edge of the second airfoil 12 while the combination of the trailing edges 31 and 32 forms a trailing edge of the second airfoil 12.

The illustrated rotor 18 includes spaced apart first and second arms 33 and 34 (herein called "rotor arms"). They extend between the first and second mounting portions 18A and 18B of the rotor 18. The rotor arm 33 includes a mid portion 33A and the rotor arm 34 includes a mid portion 34A, with the mid portions 33A and 34A being mounted on the mast 16 in diametrically opposite positions (relative to the rotational axis 17) for pivotal movement of the rotor 18 on the axle 19 in response to wind-derived airfoil forces from the first and second airfoils 11 and 12. Of course, a suitable rotor can be configured differently than the rotor 18 (e.g., a solid member, rather than two arms on each side of the mast 16, with the weight adjusted to control centrifugal force).

The outwardly disposed first and second mounting portions 18A and 18B of the rotor 18 define bearing-holding housings, and each of the airfoils 11 and 12 is mounted pivotally on a respective one of the first and second mounting portions 18A and 18B with a respective one of those bearing-holding housings and a respective one of post-and-bearing combinations 35 and 36, or other suitable means. The first and second airfoils 11 and 12 have symmetrical airfoil cross sectional shapes as viewed in transverse planes perpendicular to the longitudinally extending airfoil axes 21 and 22, and the airfoils are mounted on the first and second mounting portions 18A and 18B at or near the center of lift of their symmetrical airfoil shapes (e.g., approximately one-third the distance from the airfoil leading edges to the airfoil trailing edges) for pivotal movement about the longitudinally extending axes 21 and 22. In addition, portions 11X and 12X of the lower airfoil segments 11B and 12B are trimmed to provide clearance for 360-degree rotation of the lower airfoils about the longitudinally extending axes 21 and 22.

Turning now to FIG. 2, it is an elevation view of the VAWT 10 in which a portion of the support structure 14 is foreshortened for illustrative purposes and shown mounted on a parcel of ground 37 or other suitably rigid base. In addition, the positions of the airfoils 11 and 12 are shown with the rotor 18 in a neutral, horizontally disposed position, with the first and second springs 24 and 25 shown connected to the mast 16 by cables 24A and 25A and to the rotor 18 with cables 24B and 25B. The springs 24 and 25 operate to hold the rotor 18 in the horizontally disposed position illustrated during calm wind conditions (i.e., very little or no wind). The springs 24 and 25 exert very small force in the horizontally disposed position of the rotor 18, increasing their spring-biasing influence on the rotor 18 as the rotor moves out of the illustrated horizontally disposed position.

In the illustrated horizontally disposed position of the rotor 18, the first and second airfoils 11 and 12 (and their first and second longitudinally extending axes 21 and 22) are canted as shown in FIG. 2. They are canted in the sense that the longitudinally extending axes 21 and 22 intermediate the leading and trailing edges of the airfoils 11 and 12 are not perpendicular to the rotor axis 23 of the rotor 18; they are, instead, offset or canted from perpendicular. For the VAWT 10 shown in FIG. 2, upper ends 11C and 12C of the first and second airfoils 11 and 12 are spread apart relative to a perpendicular position (i.e., the airfoils 11 and 12 diverge upwardly), while the lower ends 11D and 12D of the airfoils are closer together (i.e., the airfoils 11 and 12 converge downwardly). The upper ends 11C and 12C diverge and the lower ends 11D and 12D converge. The longitudinally extending axes 21 and 22 are canted that way about fifteen degrees from a line perpendicular to the rotor axis 23, as indicated in FIG. 2 by an angle 38 between the trailing edge of the airfoil 11 and a line perpendicular to the rotor axis 23.

First and second push-pull rods 41 and 42 (i.e., mechanical linkages) are connected to the mast 16 (and thereby the rest of the support structure 14) at first and second mast attachment points 41A and 42A (with suitable connecting hardware in view of the up-and-down seesaw movement of the rotor 18) and to the airfoils 11 and 12 at first and second airfoil attachment points 41B and 42B (with other suitable connecting hardware in view of airfoil rotation about the axes 21 and 22). The first and second push-pull rods 41 and 42 serve as means for coupling the first and second airfoils 11 and 12 to the support structure 14, doing so for the VAWT 10 via the mast 16.

The mast 16 rotates with the rotor 18 and the drive shaft 15, and so the first and second mast attachment points 41A and 42A provide fixed reference points on the support structure 14. They provide fixed reference points in the sense that they are fixed vertically in comparison to the up-and-down movement of the first and second airfoils 11 and 12 and yet they orbit the rotational axis 17 with the airfoils 11 and 12 so that they can control the pitch of the airfoils 11 and 12. In terms of the claim language, the first and second push-pull rods 41 and 42 are mechanical linkages that are adapted to vary the pitch of the first airfoil 11 and the pitch of the second airfoil 12 as the first and second airfoils orbit the rotational axis 17 in response to the first and second airfoils moving upwardly and downwardly. They are adapted to do so in the sense that they are suitably attached to the support structure 14 (e.g., via the mast 16) and to the first and second airfoils 11 and 12 to function as described.

The foregoing arrangement resembles, in some respects, the relationship of the swashplate and main rotor blades in a semi-rigid helicopter rotor system, but the VAWT 10 is deriving energy from the passing external air mass rather than applying energy to it. The first and second airfoils 11 and 12 are adapted to cause the rotor 18 to rotate about the rotational axis 17 and to pivot on the pivotal axis 20 as the first and second airfoils 11 and 12 orbit the rotational axis 17 so that the first and second mounting portions 18A and 18B of the rotor 18 move upwardly and downwardly with the first and second airfoils 11 and 12 according to variations in the alignments of the first and second airfoils with the oncoming wind. They are adapted to do so in the sense that they are sized, shaped, and oriented according to known airfoil design principles and techniques as wind-reactive elements that produce the forces necessary to function as described.

As the rotor 18 rotates about the rotational axis 17, it tilts up and down in response to wind-derived airfoil forces, with the push-pull rods 41 and 42 causing the airfoils 11 and 12 to pivot about their longitudinally extending axes 21 and 22 in order to thereby vary their pitch. The pitch of each airfoil varies inwardly and outwardly that way between maximum inward pitch and maximum outward pitch, varying from an intermediate or normal pitch (e.g., the pitch when a plane containing the leading and trailing edges of that particular airfoil is perpendicular to the rotor axis 23).

Thus, the pitch of the airfoil 11 varies from a normal pitch for the airfoil 11 at a zero rotor-tilt angle, to a maximum outward pitch when the rotor axis 23 is inclined away from the airfoil 11 (i.e., upward rotor tilt relative to the airfoil 11), and to a maximum inward pitch when the rotor axis 23 is inclined toward the airfoil 11 (i.e., downward rotor tilt relative to the airfoil 11). Similarly, the pitch of the airfoil 12 varies from a normal pitch for the airfoil 12 at a zero rotor-tilt angle, to a maximum outward pitch when the rotor axis 23 is inclined away from the airfoil 12 (i.e., upward rotor tilt relative to the airfoil 12), to a maximum inward pitch when the rotor axis 23 is inclined toward the airfoil 12 (i.e., downward rotor tilt relative to the airfoil 12).

As the rotor 18 rotates about the rotational axis 17 to a position in which the first airfoil 11 begins to move upwind against the relative wind and the second airfoil 12 begins to move downwind, the first mounting portion 18A of the rotor 18 moves upwardly from a level horizontally extending position of the rotor 18 and the second mounting portion 18B moves downwardly. That movement is upward rotor tilt relative to the airfoil 11 and downward rotor tilt relative to the airfoil 12. As the rotor 18 tilts in that manner, the first push-pull rod 41 pulls against the first airfoil 11 at the first airfoil attachment point 41B so that the first airfoil 11 pivots about its longitudinally extending axis 21 in a direction that increases its pitch outwardly. In addition, the second push-pull rod 42 pushes against the second airfoil 12 at the second airfoil attachment point 42B so that the second airfoil 12 pivots about its longitudinally extending axis 22 in a direction that increases its pitch inwardly.

As the rotor 18 continues to rotate about the rotational axis 17, it eventually seesaws back the other way as it rotates to a position in which the second airfoil 12 begins to move upwind and the first airfoil 11 begins to move downwind. The first mounting portion 18A moves downwardly from the horizontally extending position of the rotor 18, and the second mounting portion 18B moves upwardly from the horizontally extending position (i.e., downward rotor tilt relative to the airfoil 11 and upward rotor tilt relative to the airfoil 12). As that occurs, the second push-pull rod 42 pulls against the second airfoil 12 at the second airfoil attachment point 42B so that the second airfoil 12 pivots about its longitudinally extending axis 22 in a direction that increases its pitch outwardly. In addition, the first push-pull rod 41 pushes against the first airfoil 11 at the first airfoil attachment point 41B so that the first airfoil 11 pivots about its longitudinally extending axis 21 in a direction that decreases its pitch.

The rotor 18 continues to rotate as described above in response to oncoming wind, with wind-derived airfoil forces causing the rotor 18 to seesaw cyclically about the level horizontally disposed position. Meanwhile, airfoil pitch varies due to the varying radiuses of the first and second airfoil attachment points 41B and 42B from the rotor 18 tilt axis at the axle 19 (i.e., the axis 20 identified in FIG. 1).

Preferably, the VAWT 10 is statically and dynamically balanced so that the center of inertia of the moving components of the VAWT 10 lies at the intersection of the vertically extending rotational axis 17 and the horizontally extending pivotal axis 20 identified in FIG. 1a. This imaginary center of mass does not vary and that avoids wobble caused by tilting at any rotational speed of the rotor 18. The springs 24 and 25 are used to return the teetering rotor 18 (i.e., the rotor axis 23) to a horizontally disposed position perpendicular to the vertically extending axis of rotation 17, and to limit the excursion of the rotor tilt angle during operation. These springs exert a weak resistance near the neutral, horizontally disposed position of the rotor 18, and stronger resistance as the limits of tilt excursion are approached. Since there is only weak spring resistance at rest, and no rotational rigidity to dampen tilt, a larger amount of pitch occurs at startup, making the VAWT 10 a reliably self-starting vertical axis wind engine.

Another important variable is the ratio of rotor tilt to the resulting change in airfoil pitch (referred to herein as the tilt-pitch-ratio). When the rotor 18 is horizontally disposed in the neutral tilt position (i.e., with the rotor axis 23 of the rotor 18 parallel to the horizontal X-Y plane), the airfoils are in the neutral pitch position, with their angle-of-attack axes being perpendicular to the rotor axis 23. The tilt-pitch-ratio controls the amount of pitch change introduced per degree of rotor tilt. The tilt-to-pitch ratio is used to set the rotor tilt angle for normal operation. Rotor teetering action can be reduced while still maintaining proper cyclic airfoil pitch control, by setting the tilt-to-pitch ratio to produce higher pitch angle changes per rotor tilt angle change and by increasing the strength of the centering/limiting springs to limit rotor tilt. The tilt-to-pitch ratio is controlled by the attachment points at both ends of the push-pull rods 41 and 42, including the distance from the pivotal axis 20 about which the rotor 18 pivots to the push-pull rod attachment points 41A and 42A, and the distance from the airfoil longitudinally extending axes 21 and 22 to the airfoil attachment points 41B and 42B.

In terms of size, the VAWT 10 may be scaled to any of various sizes, from four-foot long airfoils and five-foot long rotor (or smaller), for example, to significantly larger assemblies (limited, of course by practical considerations, including properties of the materials used). Generally, a larger size VAWT is more efficient because less correction is required for gyroscopic precession, which diminishes at lower rotor speeds. The effects of gyroscopic precession are described below.

Figure 3:
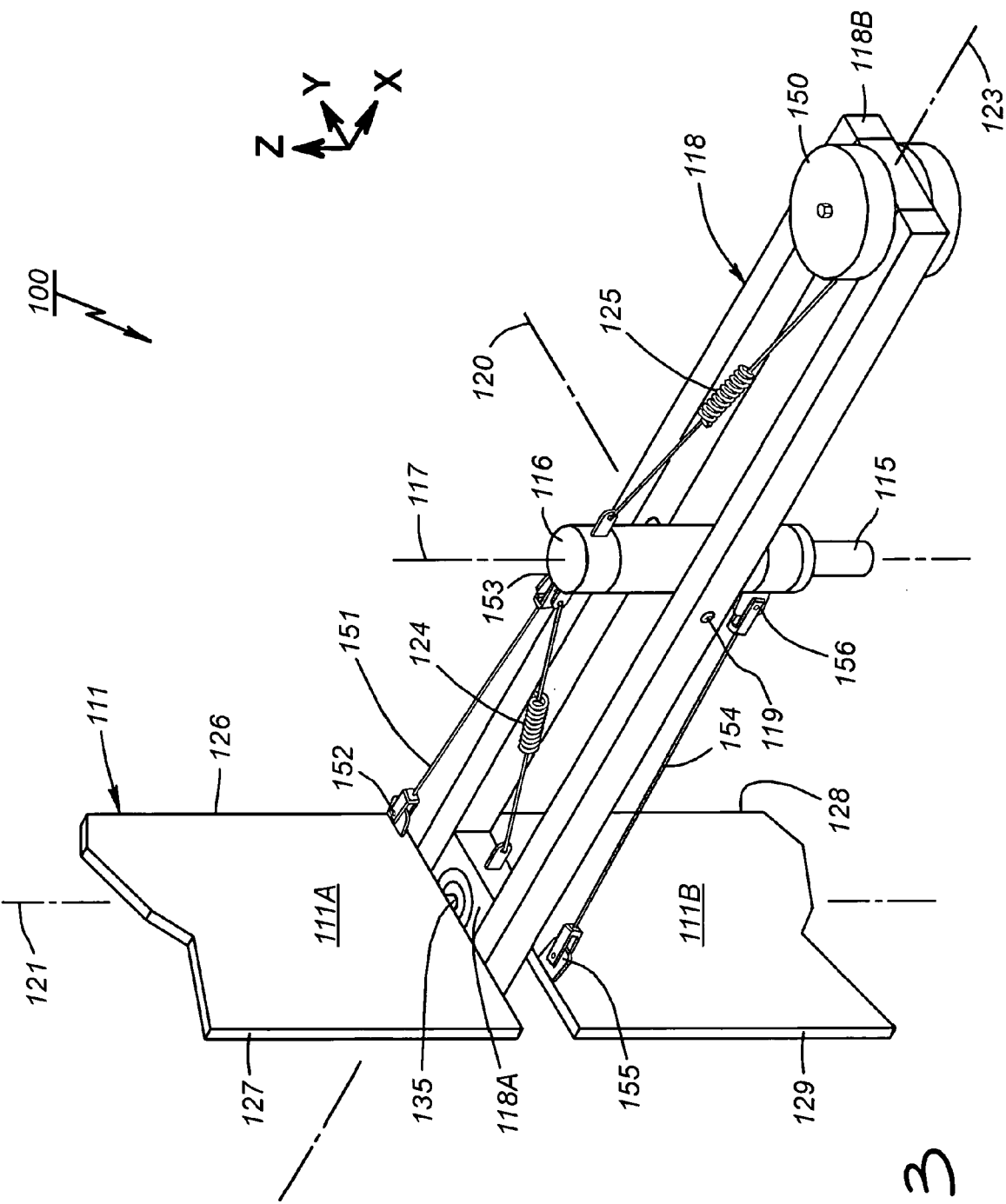
FIG. 3 is an enlarged perspective of a portion of a second partially articulating VAWT embodiment having just one perpendicularly mounted airfoil.

Second Partially Articulating Embodiment. FIG. 3 shows a VAWT 100 that embodies some variations. The VAWT 100 is similar in some respects to the VAWT 10 and so only differences are described in further detail. For convenience, reference numerals designating parts of the VAWT 100 are increased by one hundred over the reference numerals designating similar or related parts of the VAWT 10.

Similar to the VAWT 10, the VAWT 100 includes a drive shaft 115 that rotates with a connected mast 116 about a vertically extending rotational axis 117. A teetering rotor 118 is mounted on the mast 116 with an axle 119 for pivotal movement about a horizontally extending pivotal axis 120, and an airfoil 111 is mounted on an outwardly disposed first mounting portion 118A of the rotor 118 for rotation about a longitudinally extending axis 121 of the airfoil 111 that intersects a rotor axis 123 of the rotor 118. The airfoil 111 includes upper and lower segments 111A and 111B that are connected together in fixed relationship to each other so that they rotate together about the longitudinally extending axis 121, with the first mounting portion 118A of the rotor 118 defining a bearing-holding housing on which the airfoil 111 is mounted pivotally with a post-and-bearing combination 135. The upper segment 111A of the airfoil 111 has a leading edge 126 and a trailing edge 127, the lower segment 111B has a leading edge 128 and a trailing edge 129, the leading edges 126 and 128 combine as a leading edge of the airfoil 111, and the trailing edges 127 and 129 combine as a trailing edge of the airfoil 111. Centering springs 124 and 125 spring bias the rotor 118 toward a neutral, horizontally disposed position of the rotor axis 123.

Unlike the VAWT 10, the VAWT 100 includes a counterweight assembly 150 mounted on an outwardly disposed second mounting portion 118B of the teetering rotor 118, instead of another airfoil. The counterweight assembly 150 maintains the center of inertia of the rotating VAWT 100 components at the intersection of the horizontally extending pivotal axis 120 and the vertically extending axis of rotation 117. Also unlike the VAWT 10, the airfoil 111 of the VAWT 100 is mounted on the first mounting portion 118A of the rotor 118 so that the longitudinally extending axis 121 of the airfoil 111 is perpendicular to the rotor axis 123 of the teetering rotor 118. In addition, the upper section 111A of the airfoil 111 has more surface area than the lower section 111B, being of the same chord width as the lower section 111B, but larger in its vertical dimension. The difference in surface area acts to teeter the rotor 118 as discussed later on in this description.

A first pitch-controlling cable 151 connects a leading edge attachment point 152 to an upper mast attachment point 153, and thereby to the rest of the VAWT 100 support structure below the drive shaft 115 (a support structure that may be similar to the support structure 14 for the VAWT 10 but that is not shown fully in FIG. 3). Similarly, a second pitch-controlling cable 154 connects a trailing edge attachment point 155 to a lower mast attachment point 156. The leading and trailing edge attachment points 152 and 155 are equidistant from the longitudinally extending axis 121 of the airfoil 111, with equal cable radiuses from respective ones of the upper and lower mast attachment points 153 and 156, so that the rotor 118 can effect pitch changes on the airfoil 111 without cables 151 and 154 binding. The VAWT 100 may use a pitch-controlling push-pull rod instead of the two cables 151 and 154. In operation, the rotor 118 rotates about the vertically extending rotational axis 117, with the drive shaft 115 coupling rotational movement to an output load that may be similar to the load 13 described for the VAWT 10.

Figure 4A:
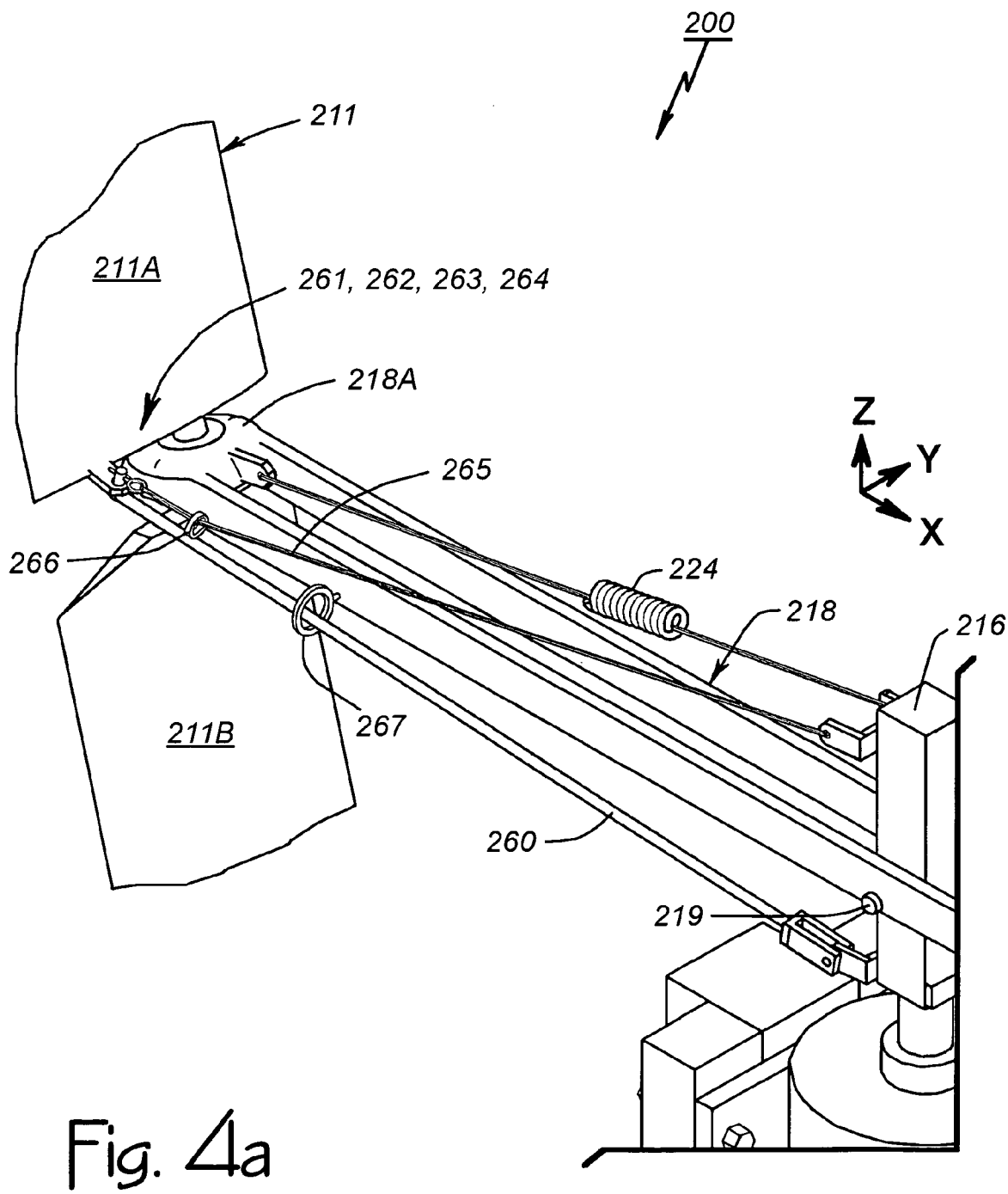
FIG. 4a is a perspective view of a third partially articulating VAWT embodiment having a safety release.
Figure 4B:
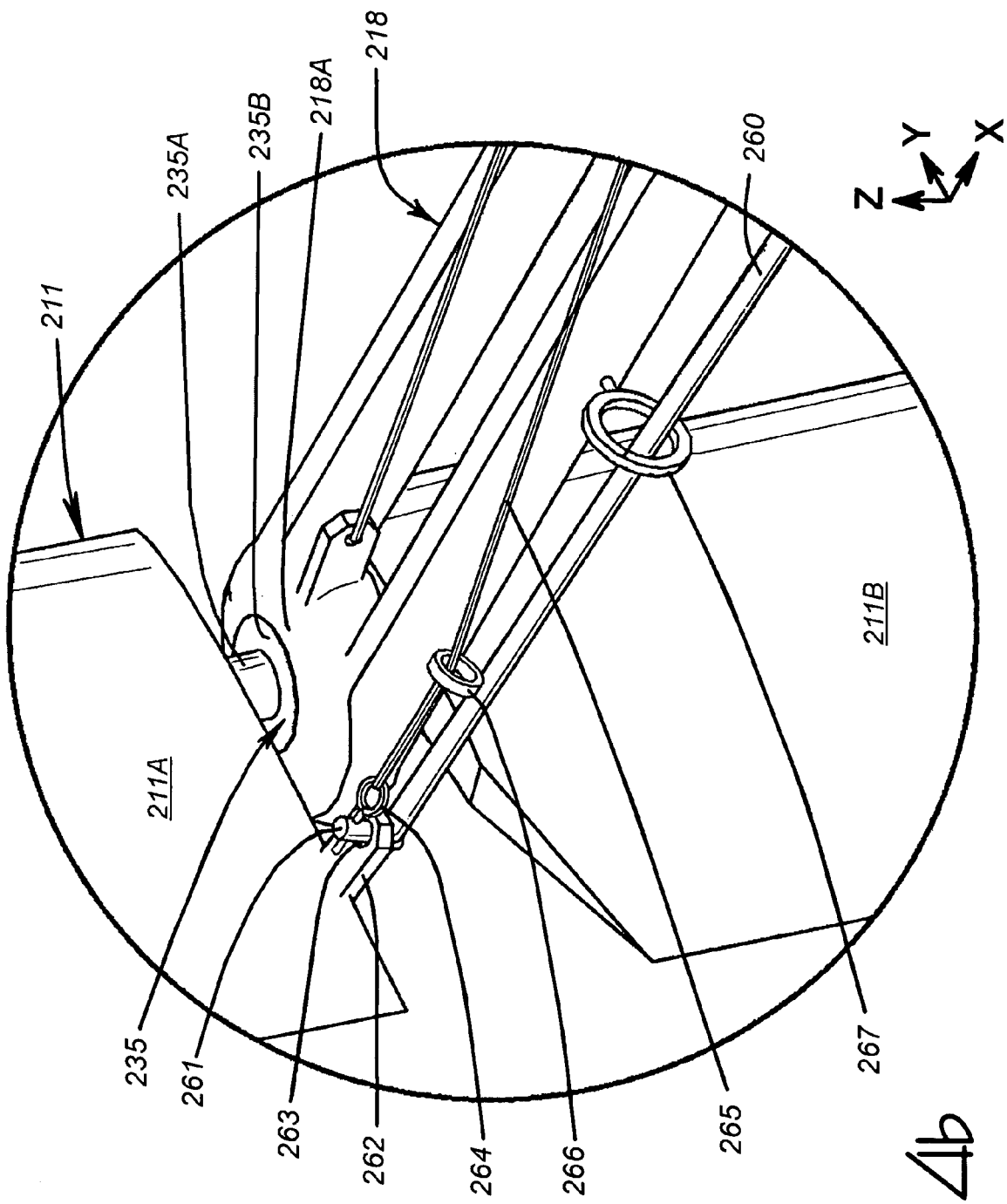

Third Partially Articulating Embodiment With Safety Release. FIGS. 4a and 4b show various portions of a VAWT 200 that embodies some safety modifications for releasing pressure on the airfoil assembly in order to avoid damage in high wind conditions, with FIG. 4b being a further enlargement of a portion of FIG. 4a. The VAWT 200 is similar in some respects to the VAWT 10 and so only differences are described in further detail. For convenience, reference numerals designating parts of the VAWT 200 are increased by two hundred over the reference numerals designating similar or related parts of the VAWT 10.

Similar to the VAWT 10, the VAWT 100 includes a teetering rotor 218 that is mounted on a mast 216 for pivotal seesaw movement about an axle 219. The rotor 218 supports an airfoil 211 having an upper segment 211A and a lower segment 211B that are mounted on a first mounting portion 218A of the rotor 218 with a post-and-bearing combination 235 (identified in FIG. 4b) that includes a shaft 235A that connects the upper and lower segments 211A and 211B in fixed alignment with each other and a bearing 235B that seats in the first mounting portion 218A.

Unlike the VAWT 10, the VAWT 200 includes a mechanical linkage in the form of push-pull rod 260 that is terminated in a 90-degree vertical bend 261 where it enters an airfoil attachment point 262 through a hole 263 that is large enough to allow for normal flex and play. Those details can be seen best in the further enlarged portion shown in FIG. 4b. A release pin 264 is fitted through a hole drilled in the end of the push-pull rod 260, holding the push-pull rod 260 in position to allow pitch-control of the airfoil 211 via the airfoil attachment point 262. A release cable 265 is connected at one end of the cable to an upper portion of the mast 216 (FIG. 4a), with the release cable 265 being routed through a first loop 266 (FIGS. 4a and 4b) that is provided on the push-pull rod 260 near the airfoil attachment point 262. In terms of the claim language, the above-described release arrangement functions as means for disengaging the mechanical linkage from the airfoil 211 when the airfoil 211 rotates about beyond a predetermined pitch limit.

The release cable 265 is shown to be taut in FIGS. 4a and 4b, but it is configured with enough slack in it to allow the teetering rotor 218 full range of seesaw motion for normal operations. When a centering-and-excursion-limiting spring 224 (FIG. 4a) exceeds a predetermined extension limit (i.e., the rotor 218 tilts beyond a predetermined tilt limit so that the airfoil 211 rotates beyond a predetermined pitch limit), the release cable 265 pulls the release pin 264 from the push-pull rod 260, thereby allowing the push-pull rod 260 to drop out of the airfoil attachment point 262. The airfoil 211 can then neutralize itself by weathervane-like movement into the wind.

Since the airfoil 211 has 360-degree rotational freedom, movement of the push-pull rod 260 is restrained by a second loop 267 on the rotor 218 that maintains the push-pull rod 260 in a position free and clear of the upper and lower segments 211A and 211B of the airfoil 211. A safety release mechanism, such as that described above, can be used on the airfoil element of a single-airfoil VAWT or on both airfoils of a dual-airfoil VAWT, releasing each airfoil as excursion limits are exceeded in the downward tilt direction. Based upon the foregoing description, one of ordinary skill in the art can add numerous other safety release mechanisms to a VAWT constructed according to the invention within the broader inventive concepts disclosed.

Tilting Forces. A VAWT constructed according to the invention is affected by four forces: tilting force, lifting force, centrifugal force, and gyroscopic precession. The first, tilting force, is created by lift resulting from wind striking the side surfaces of the canted airfoil, or from the torque effect of wind striking dissimilar upper and lower surface areas of the perpendicularly mounted airfoils, depending on the configuration. The second, lifting force on the airfoils created by properly setting the airfoils' angle-of-attack into the relative wind, is the force that causes the VAWT rotor to rotate. The third, centrifugal force, acts to counter tilting force by attempting to bring the rotor in line with an orbital path perpendicular to the axis of rotation; it tends to dampen the effects of tilting force as rotational speeds increase. The fourth, gyroscopic precession, causes the rotor's tilt axis to shift from its original alignment with the direction of wind toward a position perpendicular to the path of the wind.

FIGS. 5 and 5b are diagrammatic representations depicting a perpendicularly disposed airfoil assembly 300 and a canted airfoil assembly 400 that embody various aspects of the invention. The tilting force is the most powerful of the four forces acting on a VAWT constructed according to the invention, and it can be adjusted for a perpendicularly mounted airfoil, such as the airfoil assembly 30 in FIG. 3a, by varying the relative lengths of upper and lower airfoil segments. For a canted airfoil assembly, such as the airfoil assembly 400 in FIG. 3b, the tilting force can be adjusted by varying the surface area and mounting angle. The tilting force can also be adjusted by a combination of these.

Concerning FIG. 5a, the perpendicularly mounted airfoil assembly 300 is shown mounted on a rotor 301 that pivots at a rotor pivot point 302. The wind depicted by arrows 303 and 304 strikes the greater surface area of upper airfoil section 305 while the wind depicted by an arrow 306 strikes the lesser surface area of the shorter lower airfoil section 307, thereby causing a rotor-tilting torque force that is depicted by an arrow 308. As illustrated in FIG. 5a, the upper airfoil section 305 has a greater overall length (and surface area) than the lower airfoil section 307. The extra length presents a long moment arm to the teetering rotor 301, thereby being an efficient means of producing the torque 308 that acts about the rotor pivot point 302. Thus, only a small difference in surface area is necessary to develop an appreciable amount of rotor-tilting torque force 308 on the rotor 301.

Concerning FIG. 5b, the canted airfoil assembly 400 is mounted on a rotor 401 that pivots at a rotor pivot point 402. Wind depicted by arrows 403 and 404 strikes the equal-length flat sides of upper airfoil section 405 and lower airfoil section 406, thereby creating lifting force shown by vectors 407 and 408. Due to the vectors 407 and 408 having vector components lying perpendicular to the rotor 401, a rotor-tilting torque force acts about the rotor pivot point 402, as depicted by an arrow 409.

Figure 6:
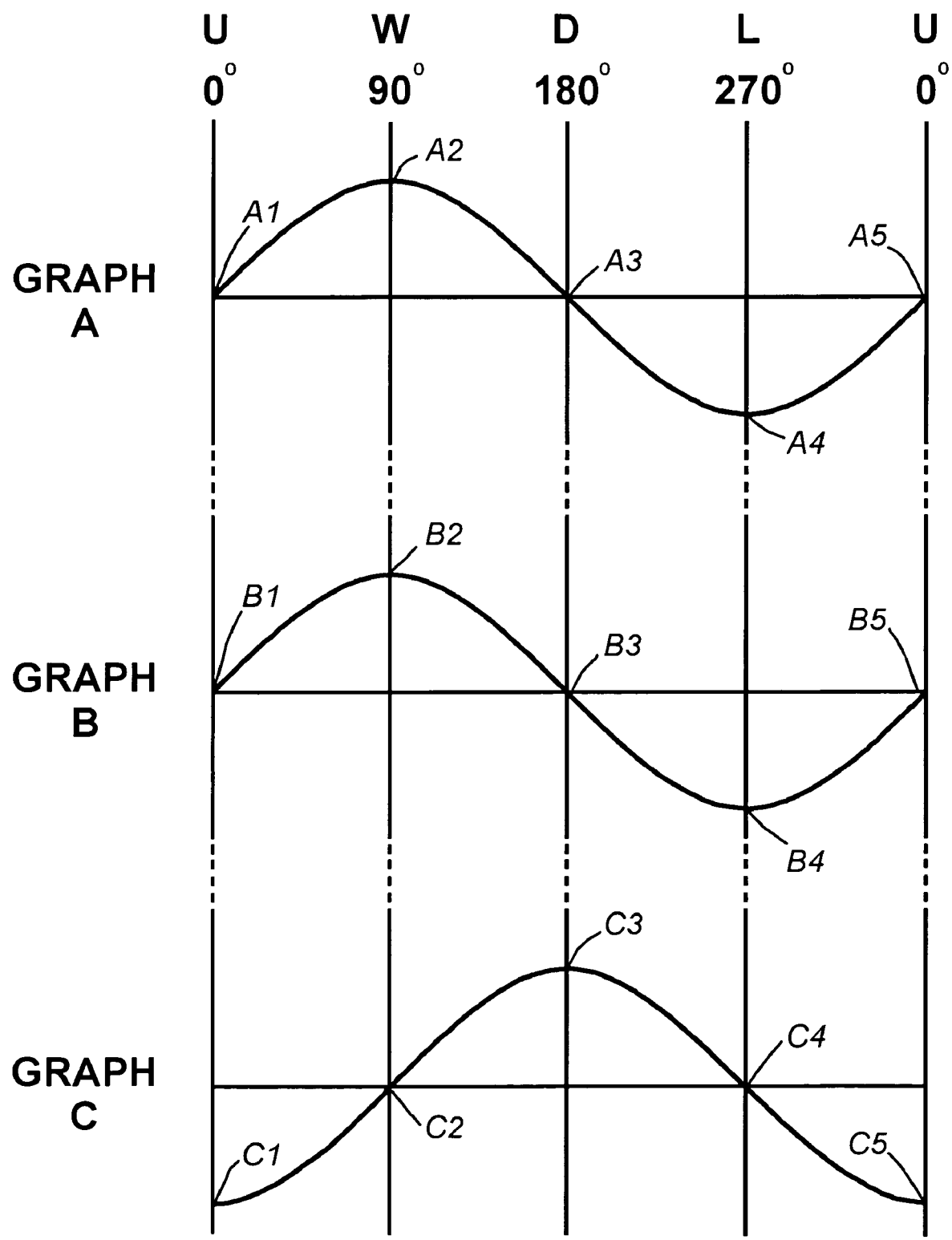
FIG. 6 is a combination of three phase graphs concerning airfoil pitch variations.

Phase Diagrams. FIG. 6 shows three graphs of the phase relationships between rotor tilt angles and airfoil pitch angles for 360 degrees of rotation. Five equally spaced vertical lines divide the graphs into four rotational quadrants. The first vertical line represents the beginning of the first or upwind quadrant, and the letter "U" at zero degrees stands for "upwind" (i.e., into the oncoming wind). Similarly, the letter "W" at 90 degrees stands for "windward" (i.e., perpendicular to the oncoming wind at the upwind side of the rotor), the letter "D" at 180 degrees stands for "downwind" (i.e., with the oncoming wind), and the letter "L" at 270 degrees stands for "leeward" (i.e., perpendicular to the oncoming wind at the downwind side of the rotor).

Graph A is a plot of airfoil pitch positions for the VAWT 10 over 360 degrees of rotation that are required to produce lift through the leeward and windward phases of travel, and to avoid drag-producing disruption to the airflow over the airfoils in the upwind and downwind legs. The plot shows that the required airfoil pitch position varies from a neutral pitch position at zero degrees (point A1 on the plot of Graph A) to a maximum outward pitch position at 90 degrees (point A2). Then, it proceeds back to the neutral pitch position at 180 degrees (point A3), to a maximum inward pitch position at 270 degrees (point A4), and to a neutral pitch position at 360 degrees, which is also zero degrees (point A5).

Graph B is a plot of rotor tilt for the VAWT 10 over 360 degrees of rotation, showing rotor tilt immediately after startup and at low rotational speeds. In the first few rotations from a non-rotating static state, the tilt of the rotor in response to the tilting force created by the airfoils directly reflects the direction of the wind. The rotor is in a level, horizontally extending position at zero degrees (point B1), after which it tilts upwardly in the windward quadrant to a maximum upward tilt at 90 degrees (point B2). The rotor then returns to the level position at 180 degrees (point B3), tilts downwardly in the leeward quadrant to a maximum downward tilt at 270 degrees (point B4), and returns to the level position at 360 degrees (point B5).

Graph C is a plot of rotor tilt for the VAWT 10 after it reaches rotational speeds sufficient to introduce gyroscopic effects. Gyroscopic precession causes the results of any force applied to a rotating system to be delayed by 90 degrees from the point of input (as compared to when the system is not rotating). Thus, the rotor is tilted downwardly to a maximum downward tilt at zero and 360 degrees (points C1 and C5), it is in the level position at 90 degrees and 270 degrees (points C2 and C4), and it is tilted upwardly to a maximum upward tilt at 180 degrees (point C3). Since the airfoil must maintain the pitch control indicated in Graph A regardless of rotor speed, some corrective action must be introduced to compensate for the destructive influences of gyroscopic precession.

Figure 7:
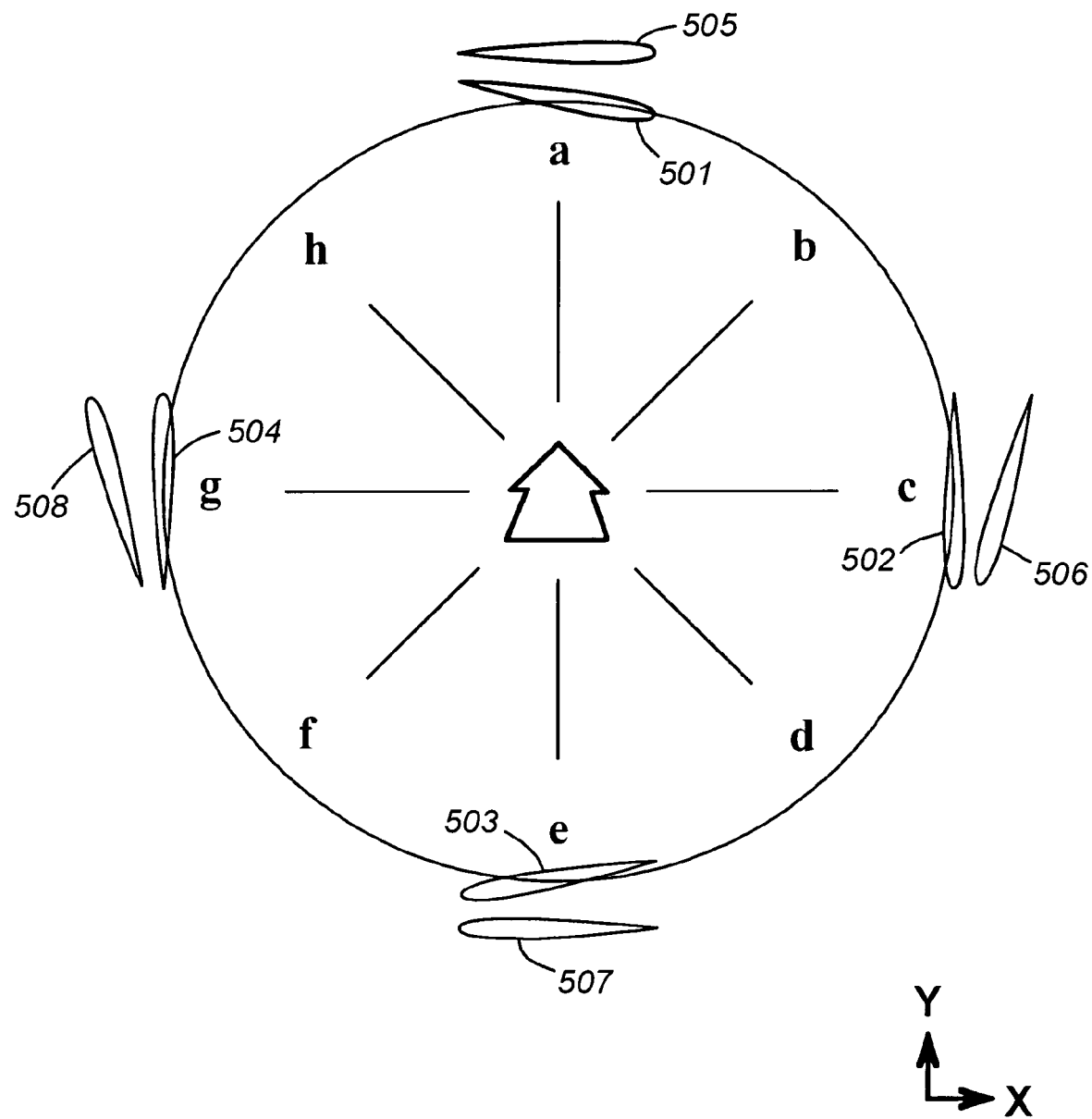
FIG. 7 is an angle-of-attack diagram.

Angle-of-Attack Diagram. FIG. 7 illustrates the shift of airfoil pitch positions resulting from the gyroscopic precession effects mentioned above for the Graph C in FIG. 6. Airfoils 501, 502, 503, and 504 are shown correctly pitched relative to the oncoming wind depicted by a centrally located arrow outline in FIG. 7. At slow rotational speeds, before the VAWT 10 is affected by gyroscopic effects, the tilt angle of the rotor is aligned along an axis a-e. Airfoils 505, 506, 507, and 508 indicate a 90-degree shift from correct pitch control attitude, which occurs as a limiting case of gyroscopic precession, with the rotor aligned along an axis C-g. The airfoil 506 and, to a lesser degree, the airfoil 508 are creating drag, and airfoils 505 and 507 are neutrally positioned where they should be pitched to produce maximum rotational lift. As shown by the Darrieus patent mentioned previously (i.e., U.S. Pat. No. 1,835,018), airfoils fixed in tangential positions are capable of producing lift when operating in relative winds produced by rotational velocities in excess of local wind speed (typically four to six times as much). This cannot be achieved by the pitch control method shown in FIG. 3, however, because when the rotor tilt axis shifts (e.g., the rotor axis 123 of the rotor 118), the airfoil 506 acts an effective brake and prevents the system from achieving further rotor speed. Typically, the configuration of the second embodiment described above will stabilize with a tilt axis near an axis b-f, that being a balance between startup and gyroscopic precession forces.

An advantage of the canted airfoils 11 and 12 of FIGS. 1 and 2, besides the ability to produce tilting force, occurs when gyroscopic precession causes airfoil positions near position C in FIG. 7 to manifest out-of-phase pitch as shown with the airfoil 506. With the canted airfoils 11 and 12, nose-in pitch (i.e., inward pitch) introduced at position C creates a lifting force on the canted surfaces (as depicted in FIG. 5b) that places downward pressure on the opposite end portion of the rotor near position g. This force helps to compensate for the shifted tilt axis caused by gyroscopic precession. The downward component of the primary wind-generated tilting force is centered at position a, and it shifts toward position C due to gyroscopic precession. The corrective force created by the canted airfoils lifting near position C creates downward force near position g, which shifts toward position a due to gyroscopic precession. The more the primary rotor tilt axis shifts toward position C, the stronger a corrective force is generated near position g. The summation of these two forces yields a more productive tilt axis, allowing rotor speeds to greatly exceed wind speeds.

Structural Alternatives. The rotors 18 and 118 are illustrated as elongated members having diametrically opposite first and second end portions (e.g., the mounting portions 18A and 18B of the rotor 18). Other rotor shapes may be used for the teetering rotor, however, including streamlined oval or airfoil shapes, for example. Concerning the push-pull rods 41 and 42 of the VAWT 10, they are shown in FIG. 2 to be positioned below the rotor 18, while the centering springs 24 and 25 are shown to be positioned above the rotor 18. Those positions may be reversed without departing from the inventive concepts disclosed. Furthermore, push-pull rods and centering/limiting springs can both be mounted above or both below the rotor. Attachment points are located suitably for such alternate positions to achieve the desired pitch changes.

Figure 8:
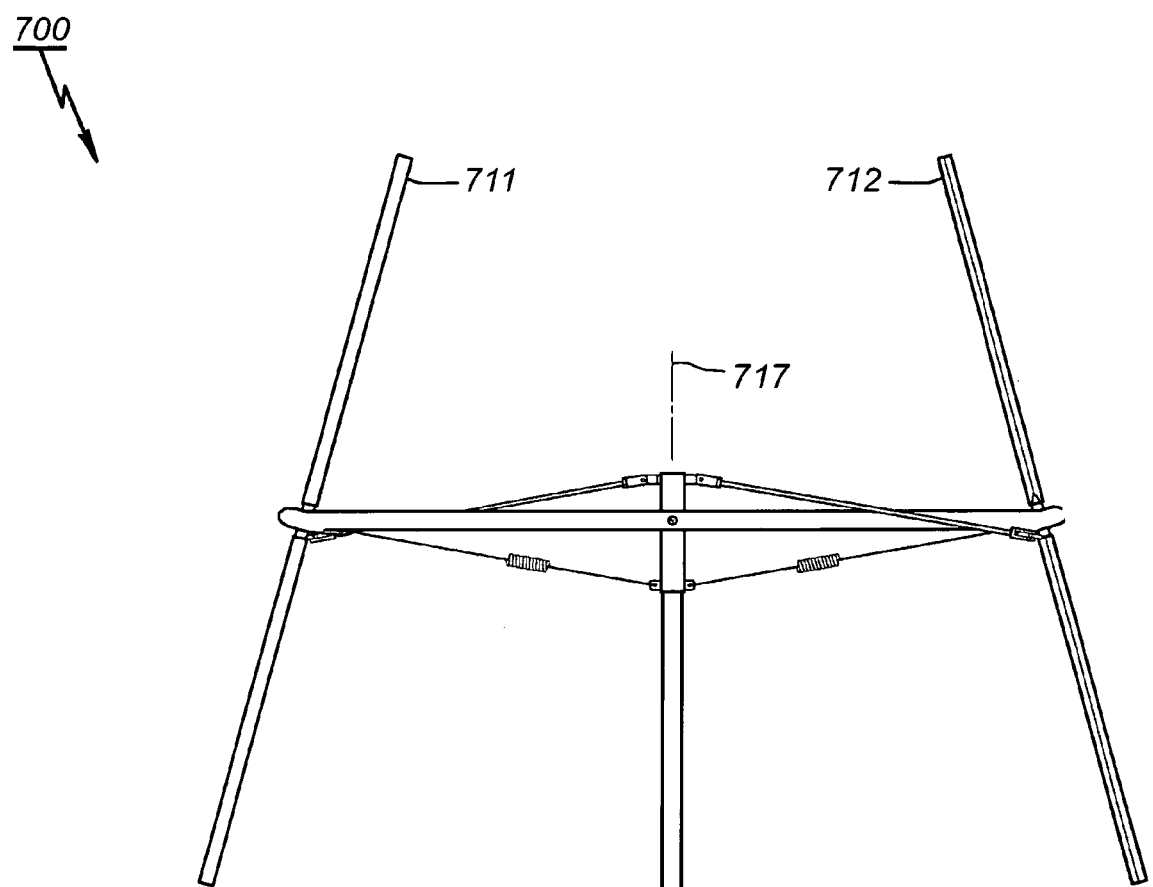
FIG. 8 is a perspective view of a fourth partially articulating VAWT embodiment having two airfoils that converge upwardly and diverge downwardly.

Fourth Partially Articulating Embodiment. FIG. 8 shows a VAWT 700 having airfoils 711 and 712 mounted so that they converge upwardly and diverge downwardly. Rotating forces are reversed from those affecting the VAWT 10, and so the VAWT 700 will rotate about a rotational axis 717 in a direction opposite to the direction in which the VAWT 10 rotates about the rotational axis 17. Based upon the foregoing descriptions, one of ordinary skill in the art can readily reverse airfoil directions and relocate push-pull rod attachment points to produce rotation about the rotational axis 717 in a desired direction.

Fully Articulating Embodiment. FIGS. 9-14 of the drawings show various aspects of a VAWT 800 having a fully articulating rotor (i.e., a 360-degree articulating rotor). As to illustrated in FIG. 9, the fully articulating rotor of the VAWT 800 includes three rotor arms 801, 802, and 803 that support three downwardly converging airfoils 804, 805, and 806 on a drive shaft 808 via a gimbaled rotor hub assembly 807 for rotational movement of the drive shaft 808 and the rotor hub assembly 807 (and orbital movement of the three airfoils 804, 805, and 806) about a vertically extending rotational axis 809 that is parallel to the Z axis of the X-Y-Z coordinate system shown in FIG. 9. An upwardly converging airfoil arrangement may be used instead. As the airfoils 804, 805, and 806 orbit the rotational axis 809 in response to oncoming wind, the rotor arms 801, 802, 803 move (i.e., tilt) upwardly and downwardly in response to wind-derived airfoil forces while mechanical linkages 810, 811, and 812 cause the airfoils to rotate about their longitudinally extending airfoil axes 813, 814, and 815 (their angle-of-attack axes).

Each of the airfoils 804, 805, and 806 is spaced apart radially from the rotational axis 809 along a respective one of radials 816, 817, and 818. Each of the radials 816, 817, and 818 intersects a respective one of the airfoil axes 813, 814, and 815 at three intersection points 819, 820, and 821. Those three points of intersection define an orbital plane that is disposed parallel to the Y-Z plane in conditions of no oncoming wind (i.e., a level "at-rest" position). The orbital plane can tilt from that at-rest position about any horizontal axis in response to wind-derived airfoil forces irrespective of the orbital position of the airfoils 804, 805, and 806. In other words, the VAWT 800 includes a fully articulating rotor; the airfoils 804, 805, and 806 can pivot upwardly and downwardly relative to where the three radials 816, 817, and 818 intersect the rotational axis 809.

Figure 10:
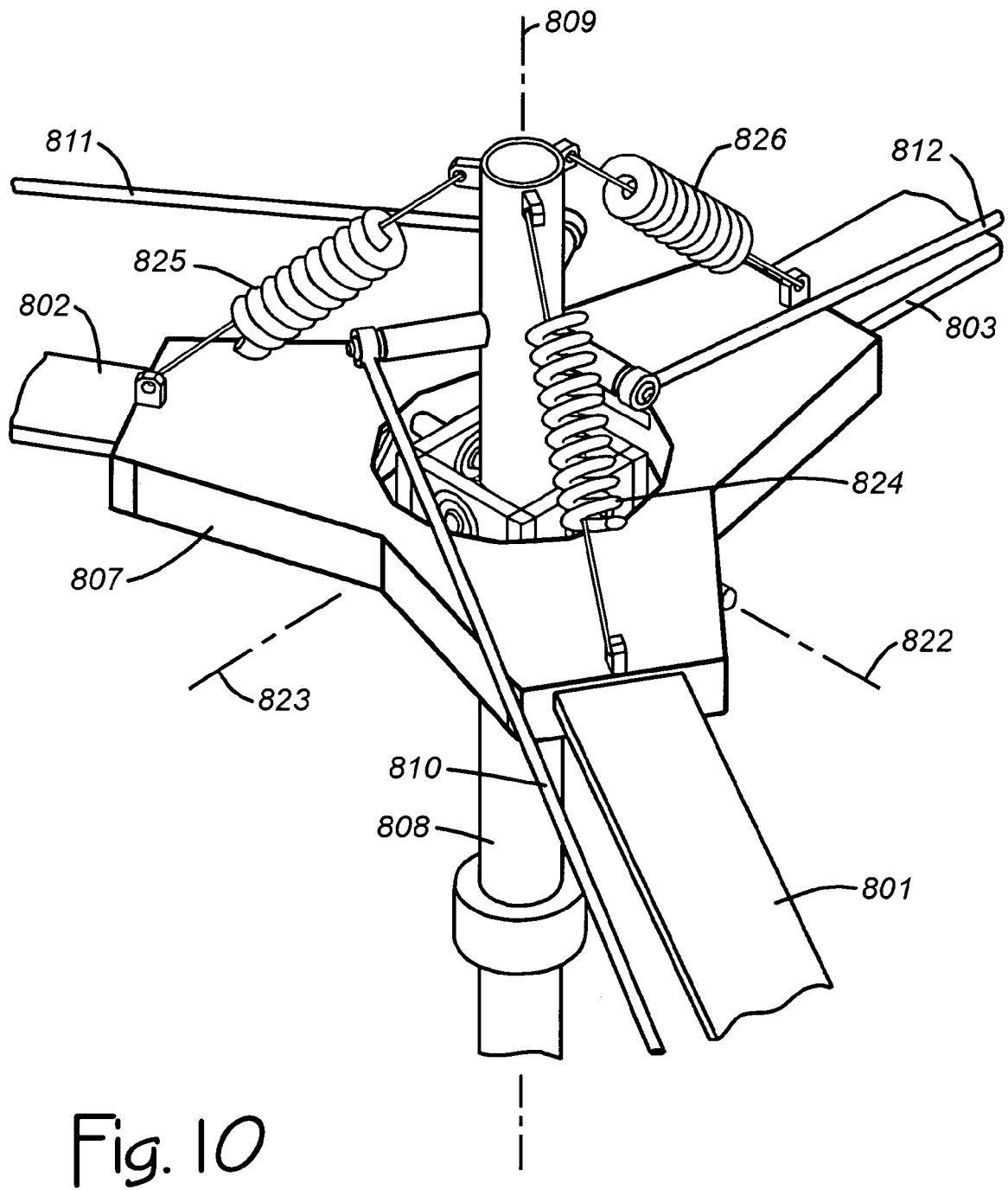
FIG. 10 is an enlarged detail of a portion of the gimbaled rotor hub assembly of the fully articulating VAWT embodiment.

A gimbal is a known mechanical device that allows the rotation of an object in multiple dimensions. It is typically made up of two or three pairs of pivots, mounted at right angles on orthogonal axes. A three-axis gimbal may allow an object mounted on it to remain in a horizontal plane regardless of the motion of its support. Shipboard compasses, chronometers, stove, and even drink holders are typically mounted on gimbals to keep them level to the horizon at all times, and gimbals are often seen providing the exoskeleton for a laboratory demonstration gyroscope. As shown in FIG. 10, the gimbaled rotor hub assembly 807 of the VAWT 800 is configured to enable pivotal movement of the rotor hub assembly 807 (and thereby the airfoils 804, 805, and 806) about first and second orthogonal axes 822 and 823 as the rotor hub assembly 807 rotates about the rotational axis 809. The axes 822 and 823 are perpendicular to each other and to the rotational axis 809. Movement about the rotational axis 809 is constrained so that when the rotor hub assembly 807 turns, it forces the drive shaft 808 to turn with it. From the above and subsequent descriptions, one of ordinary skill in the art can readily implement a fully articulating rotor using alternatives to the illustrated gimbal system, including, for example, spherical radial bearings, ball joints, and/or elastomeric couplings.

FIG. 10 also illustrates three springs 824, 825, and 826 (sometimes referred to as tensioners) that function to spring bias the hub assembly 807 toward the at-rest position mentioned above. The springs also serve to limit the tilt excursion in any direction. In addition, the vertical components of force that the springs provide can relieve some of the load on the gimbal support bearings.

Figure 11:
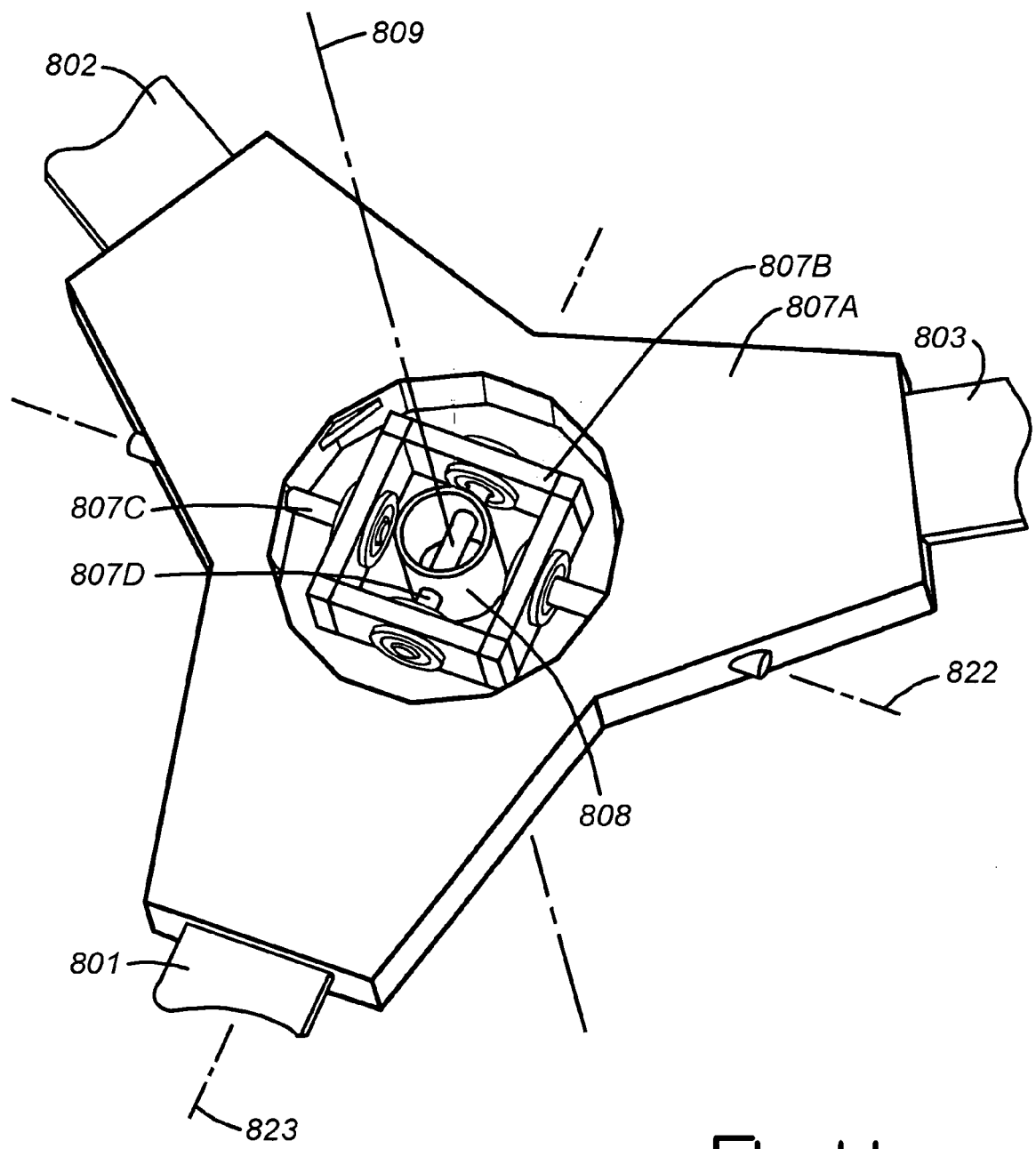
FIG. 11 is an enlarged detail of the gimbaled rotor hub assembly portion of the fully articulating VAWT embodiment.

FIG. 11 is an enlarged view of various components of the gimbaled rotor hub assembly 807. A first component of the hub assembly 807 to which the rotor arms 801, 802, and 803 are connected (referred to herein as a main component 807A) is connected rotatably to a secondary component that is referred to herein as a gimbal frame component 807B. The main component 807 is connected to the gimbal frame component 807B by a first axle 807C for rotation relative to the gimbal frame component 807B about the first orthogonal axis 822 that was mentioned previously with reference to FIG. 10. The gimbal frame component 807B is, in turn, connected rotatably to the drive shaft 808 by a second axle 807D for rotation relative to the drive shaft 808 about the second orthogonal axis 823. That gimbal arrangement enables the central component 807A of the gimbaled rotor hub assembly 807 to tilt about the first and second orthogonal axes 822 and 823 as the central component 807A rotates with the gimbal frame component 807B and the drive shaft 808 about the rotational axis 809.

Among other advantages, having three airfoils helps smooth out sinusoidally varying rotational energy caused by the varying drag profiles the airfoils present as they orbit the rotational axis 809. With fewer airfoils, and the inherently sinusoidal power yield, it is possible for the teetering rotor of a less-than-three-airfoils VAWT to come to rest at a low point in the power cycle, with the airfoil chord axes aligned with the wind flow. Normally, wind variability and hardware slack allows such a teetering-rotor VAWT to start easily. If subjected to a sufficient load at the load point in the power cycle, however, such a teetering-rotor VAWT may have trouble starting. A three-airfoil configuration overcomes that concern because there is always at least one airfoil at or near its optimal power position.

Apart from start-ability characteristics, the teetering-rotor VAWT provides an easy means for furling. As applied herein to VAWT airfoils, furling refers to positioning an at-rest airfoil relative to incoming wind for less drag, and the teetering-rotor VAWT may be described as self-furling. Applying a large load by shorting the outputs of a generator load or closing a valve on a water pump load, for example, causes the teetering-rotor VAWT to naturally come to rest at a low power point in its rotational cycle, with the airfoil(s) faired into the wind. They are furled in that sense and the teetering-rotor VAWT may be described as self-furling. A fully articulating three-airfoil VAWT, however, is not.

Figure 12:
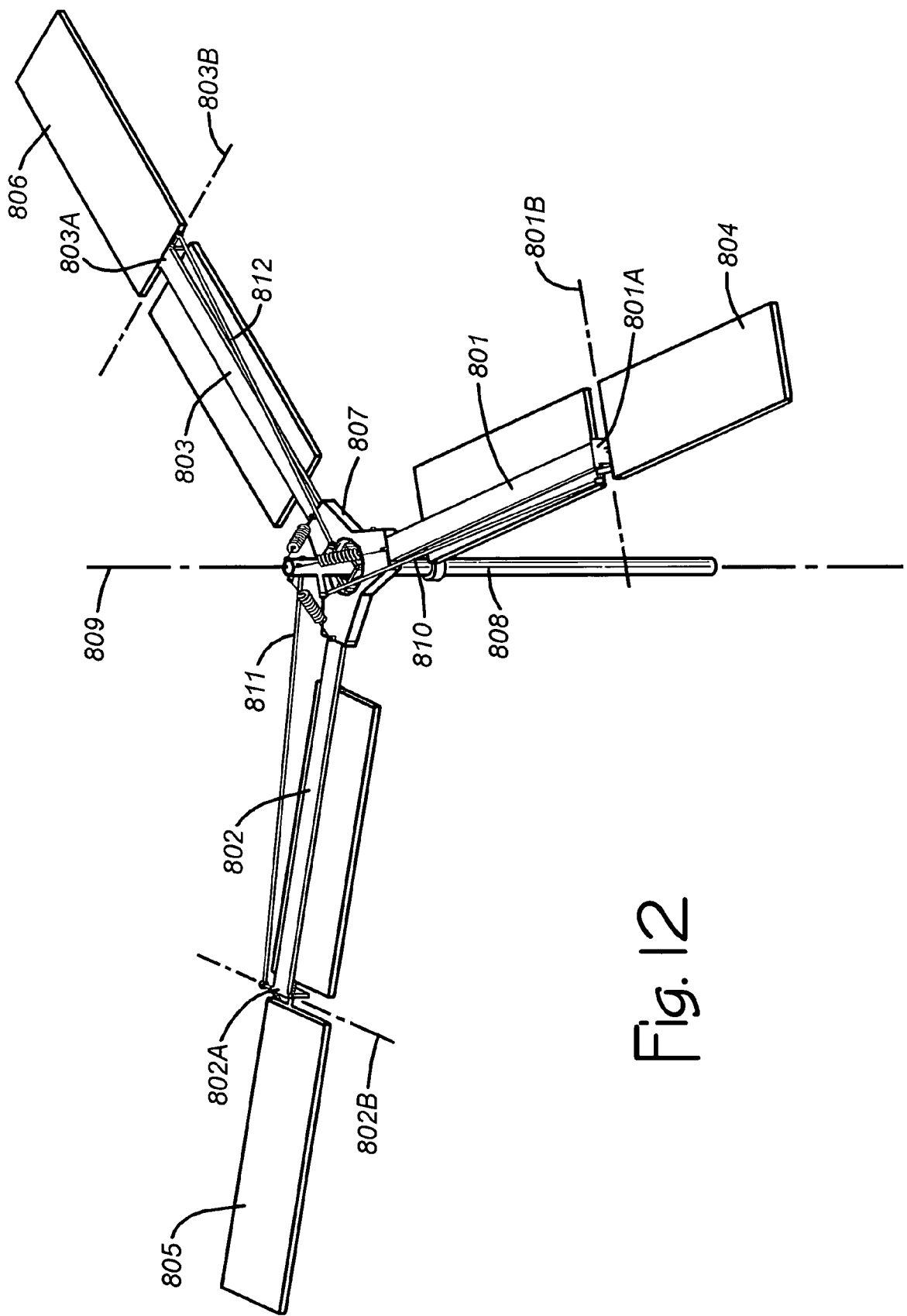
FIG. 12 is a perspective view of the fully articulating VAWT embodiment with the airfoils in a furled configuration.
Figure 13:
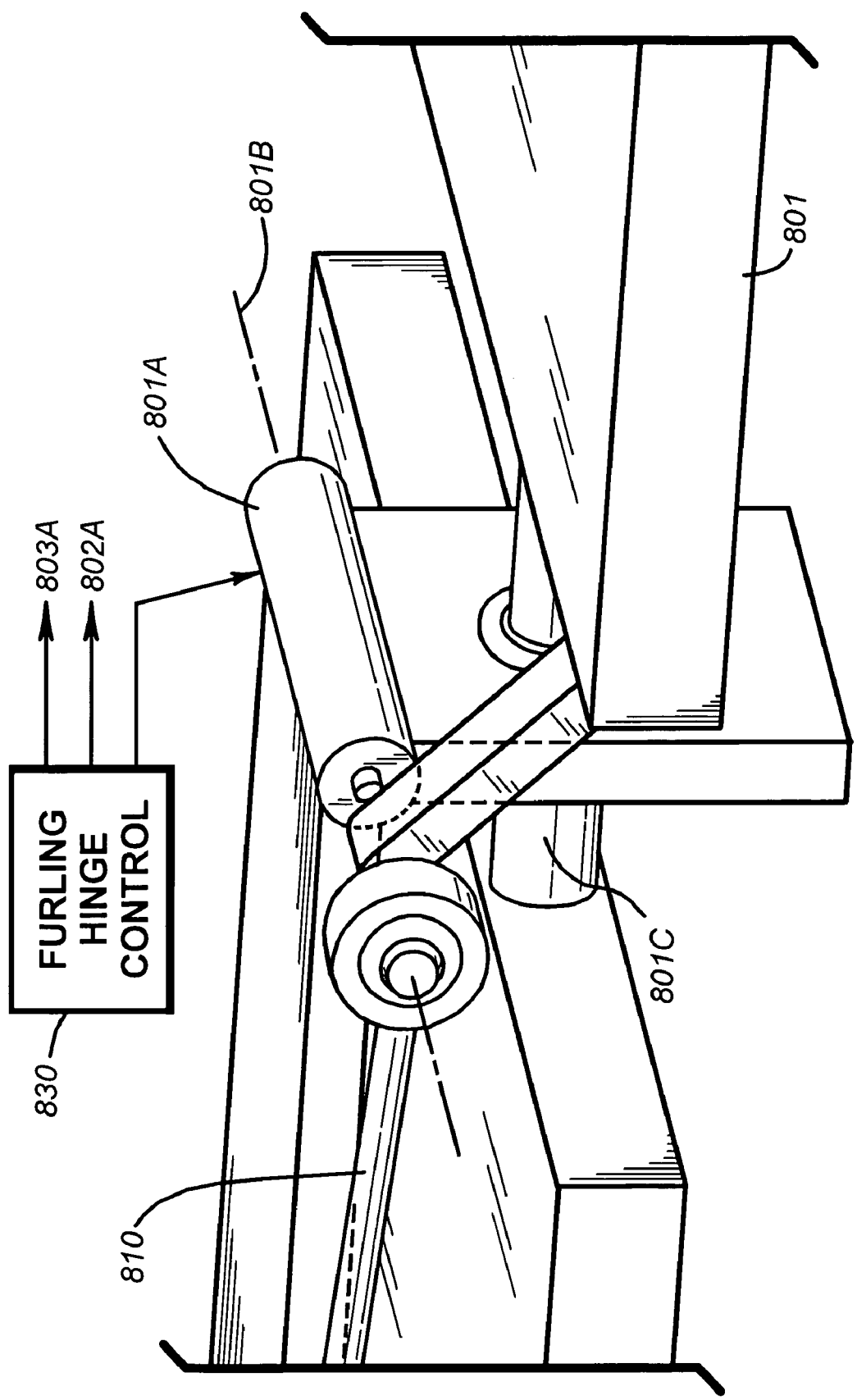
FIG. 13 is an enlarged detail of the furling hinge assembly of the fully articulating VAWT embodiment.
Figure 14:
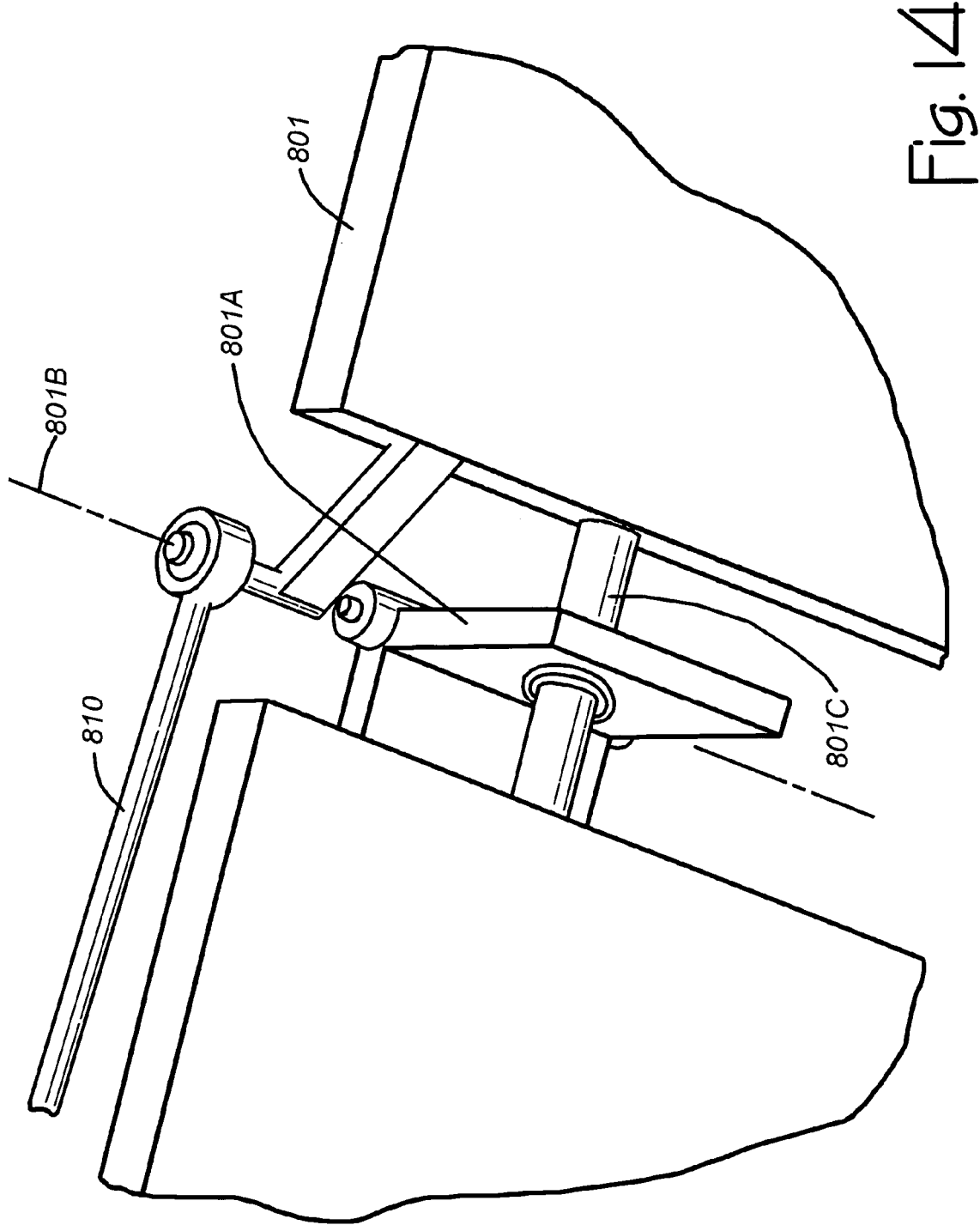
FIG. 14 is an enlarged view of the furling hinge assembly of the fully articulating VAWT embodiment as viewed looking upwardly from a position underneath the furling hinge assembly.

For the same reasons that give the three-airfoil VAWT 800 an advantage of starting under a greater load from any position, the VAWT 800 requires means for protecting the airfoils 804, 805, and 806 from damaging winds. They cannot all be faired into the wind simultaneously by stopping the VAWT 800 under load. FIGS. 12, 13, and 14 show various details of components that enable furling of the three airfoils 804, 805, and 806 of the VAWT 800 by pivoting them to furled positions next to the rotor arms 801, 802, and 803. The combination of those components function as means for repositioning the airfoils relative to the rotor during periods of time in which the rotor is not rotating about the rotational axis, in order to thereby lessen airfoil exposure to wind damage. As illustrated in FIG. 12, each of the rotor arms 801, 802, and 803 includes a respective one of hinges 801A, 802A, and 803A, with each hinge connected to a respective one of the airfoils 804, 805, and 806 in order to enable pivotal movement of each airfoil about a respective one of pivotal axes 801B, 802B, and 803B.

Figure 9:
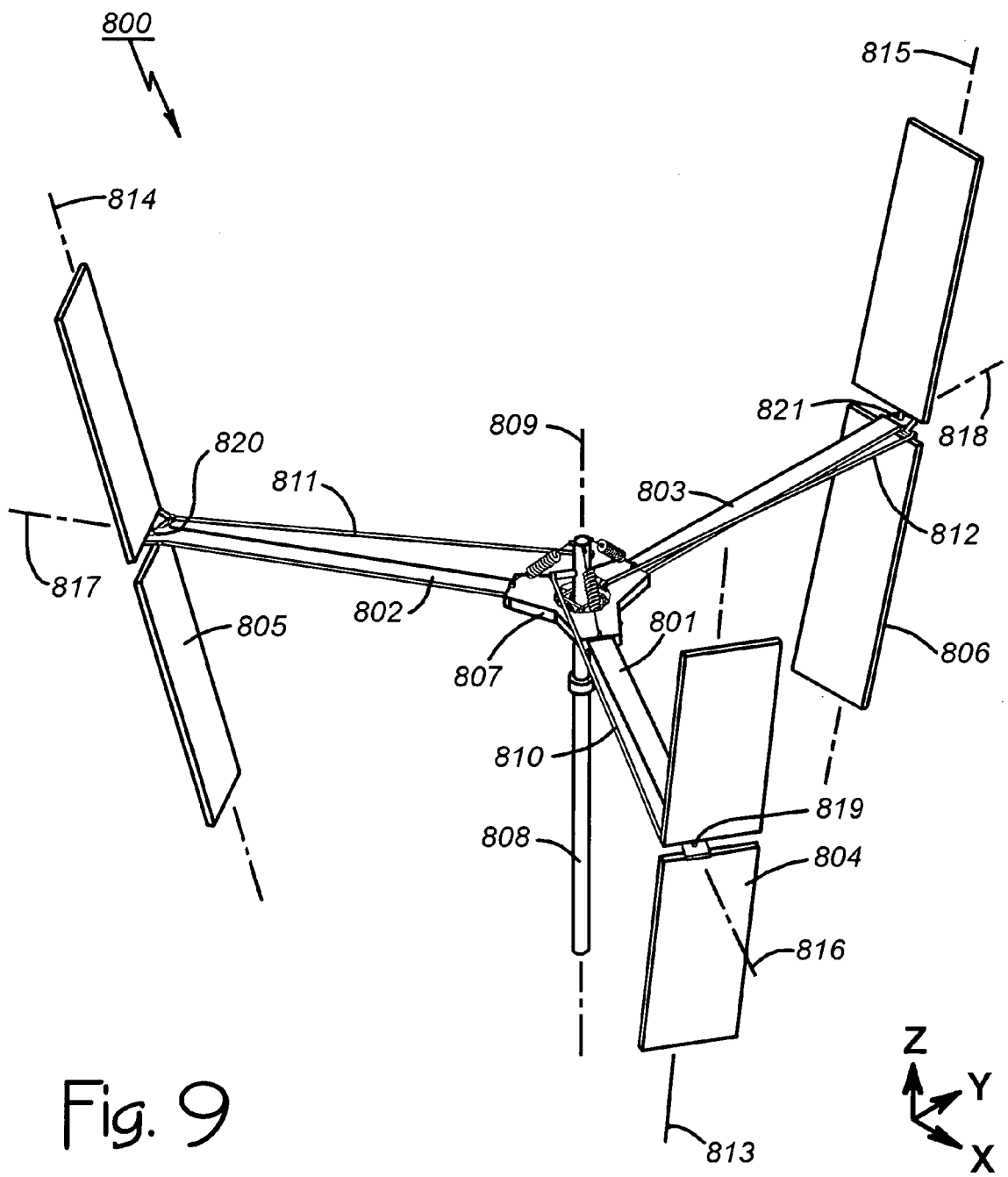
FIG. 9 is a perspective view of a fully articulating VAWT embodiment having three airfoils on a 360-degree articulating rotor assembly.

A furling hinge control 830 (shown diagrammatically in FIG. 13) is included that functions as means for controlling the hinges 801A, 802A, and 803A, and thereby pivoting the airfoils 804, 805, and 806 about the pivotal axes 801B, 802B, and 803B. It is a suitable device (e.g., mechanical, electro-mechanical, pneumatic, and/or otherwise) that is operatively connected to the hinges and activated locally or remotely in order to pivot the airfoils between normal operating positions of the airfoils 804, 805, and 806 and furled positions of the airfoils. In the normal operating positions of the airfoils 804, 805, and 806, they are canted (as shown in FIG. 9 and previously discussed). In the illustrated furled positions of the airfoils 804, 805, and 806 shown in FIG. 12, they are folded up under the rotor arms 801, 802, and 803 (by operation of the hinges 801A, 802A, and 803A under control of the furling hinge control 830) in order to protect them from damage in conditions of high winds. Of course, the rotor is stopped, and preferably locked, prior to furling.

As shown in FIGS. 13 and 14, the pivotal axis 801B is common to both the hinge 801A and the bearing of the push-pull rod mechanical linkage 810; both pivot about the pivotal axis 801B. Similarly, the pivotal axis 802B is common to both the hinge 802A and the bearing of the mechanical linkage 811, while the pivotal axis 803B is common to the hinge 803A and the bearing of the mechanical linage 812. Based upon the foregoing and subsequent descriptions, one of ordinary skill in the art can readily implement a VAWT according to the invention and provide it with furling capabilities, all as described and shown and/or with airfoils that can be furled otherwise than in the manner and to the extent illustrated in FIG. 9, depending on the precise design and wind conditions anticipated. The rotor arms 801, 802, and 803 can, for example, be hinged to the hub assembly 807 (with the mechanical linkages 810, 811, and 812 suitably adapted) so that the rotor arms 801, 802, and 803 and airfoils 804, 805, and 806 can be folded downwardly alongside the drive shaft 808 when desired for additional furling.

Figure 15:
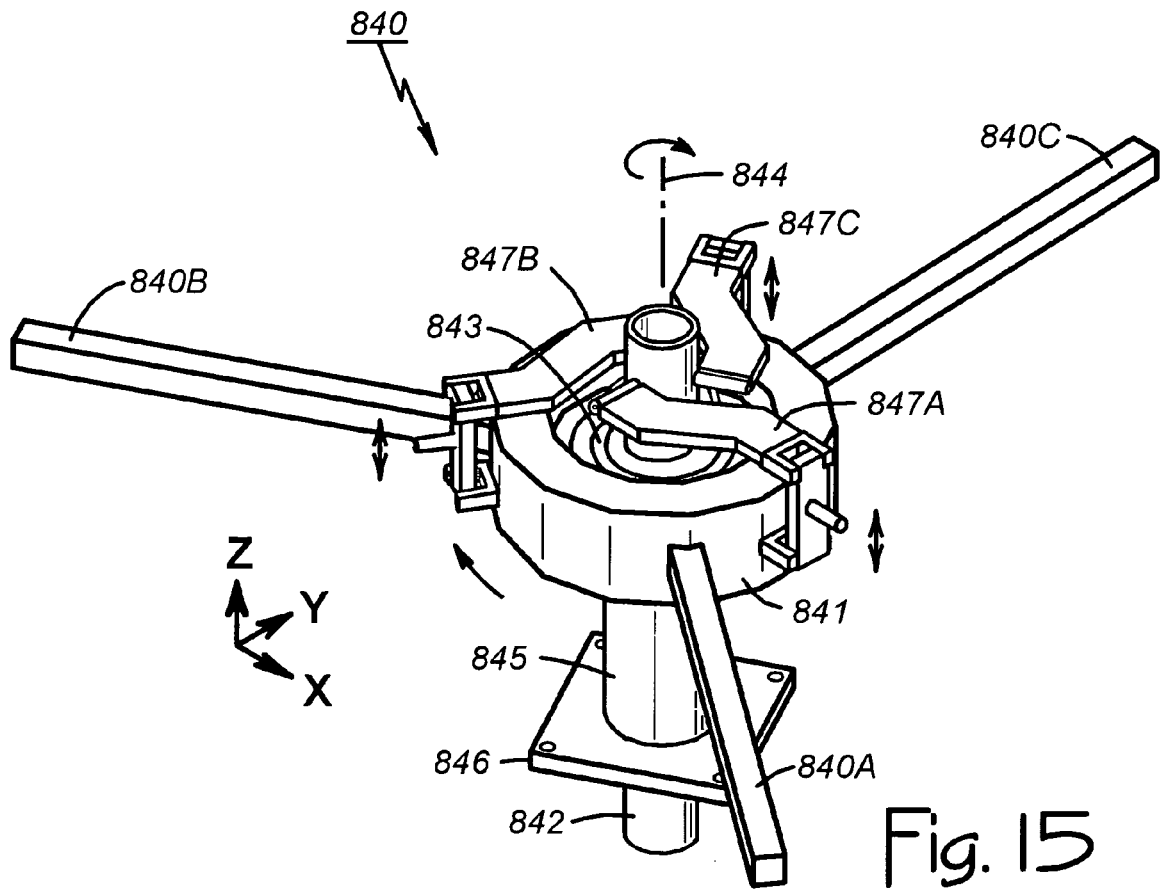
FIG. 15 is a perspective view of a portion of an alternate, fully articulating rotor hub assembly supported by a spherical radial bearing.
Figure 16:
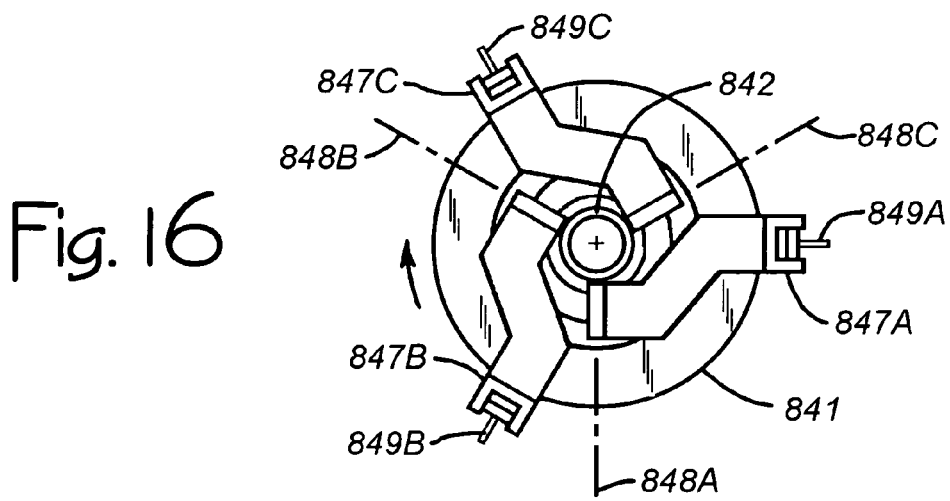
FIG. 16 shows the hub block and torque linkages of the alternate, fully articulating rotor hub assembly as viewed from above the assembly.

Turning now to FIGS. 15 and 16, they show various aspects of another fully articulating rotor assembly having a hub assembly 840 with a hub block 841 and radially extending rotor arms 840A, 840B, and 840C that extend radially from the hub block 841. The hub block 841 is mounted on a drive shaft 842 with a spherical radial bearing assembly 843 for rotation about a vertically extending rotational axis 844. The rotor arms 840A, 840B, and 840C extend radially from the hub block 841 to three airfoils that may be similar to the airfoils of the VAWT 800 discussed above. For illustrative purposes, only inwardly disposed portions of the rotor arms 840A, 840B, and 840C are shown in FIG. 15 and the three airfoils are not shown.

A stationary mast portion 845 of the hub assembly 840 extends downwardly from the bearing assembly 843 to a mounting plate 846. The stationary mast portion 845 holds bearings (not visible) that provide a rotational mounting through which the drive shaft 842 extends. Torque transfer links 847A, 847B, and 847C (FIGS. 15 and 16) mechanically couple the hub block 841 to the drive shaft 842 while allowing full articulation of the hub block 841. Each of the transfer links 847A, 847B, and 848C is mounted pivotally on the drive shaft 842 for pivotal movement about a respective one of horizontally extending pivot axes 848A, 848B, and 848C (FIG. 16). Push/pull rod mechanical linkages extend from attach points 849A, 849B, and 849C on the torque transfer links 847A, 847B, and 848C to the three airfoils. As the hub block 841 rotates with the drive shaft 842 about the rotational axis 844, wind-derived airfoil forces cause the hub block 841 to tilt about the pivot axes 848A, 848B, and 848C, as indicated by the double-headed arrows in FIG. 15, thereby causing the mechanical linkages 849A, 849B, and 849C to actively vary the pitch of the three airfoils as the three airfoils orbit the rotational axis 844.

Figure 17:
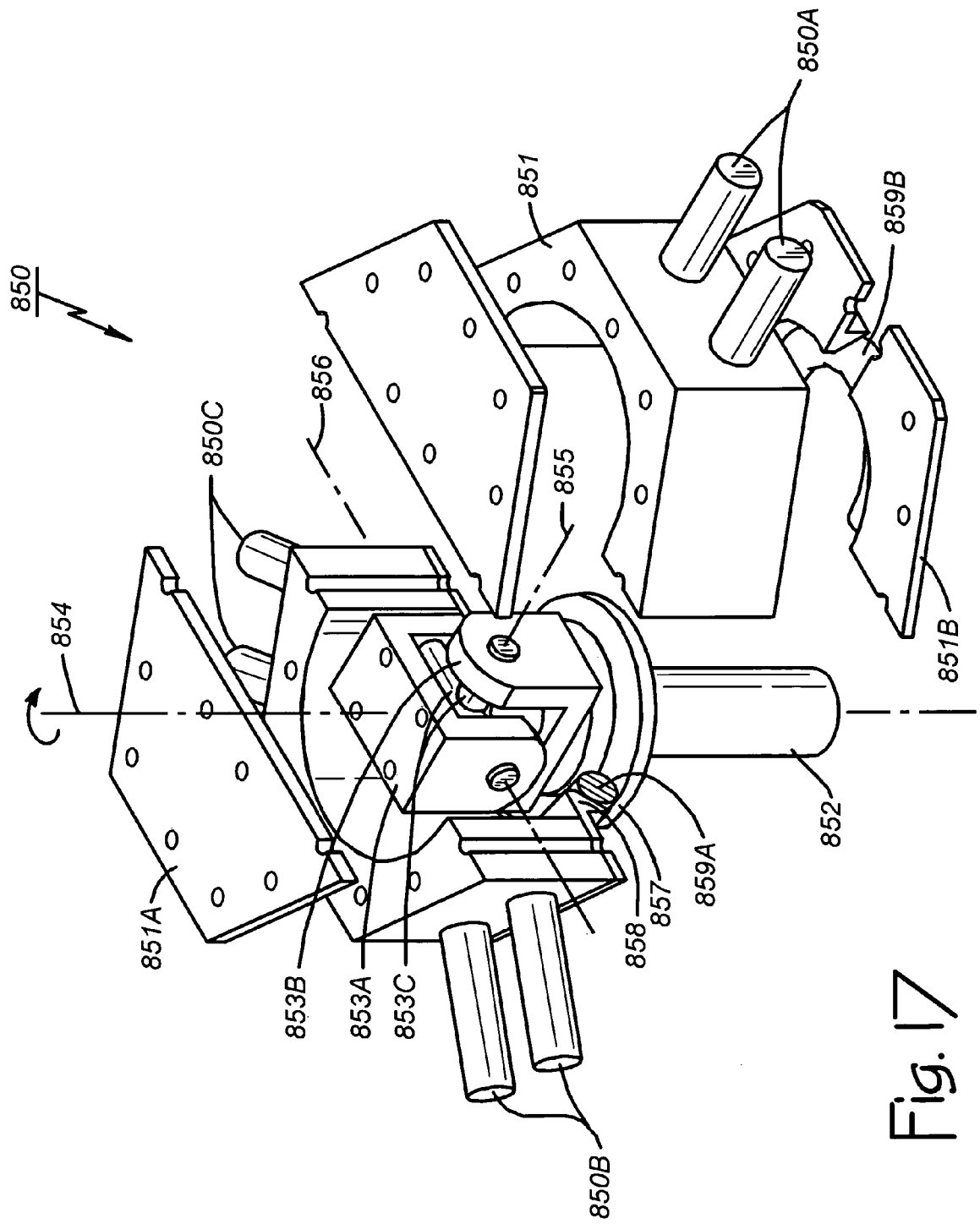
FIG. 17 is an exploded view illustrating a fully articulating gimbaled rotor hub assembly incorporating a U-joint (universal joint) and an elastomeric dampener.
Figure 18:
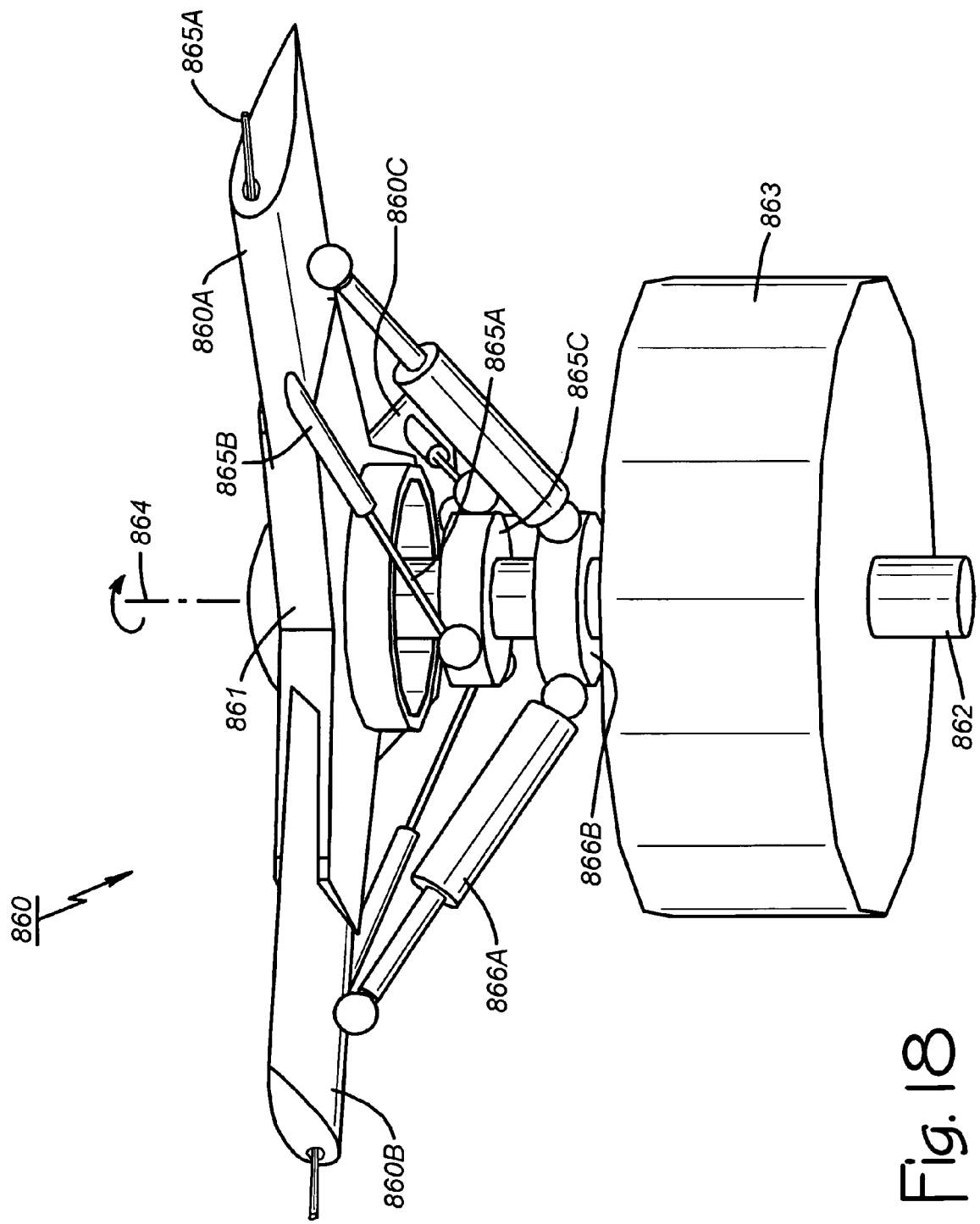
FIG. 18 illustrates another rotor hub assembly that supports streamlined rotor arms and opens downwardly with control components mounted underneath, including dampeners and push-pull cables within cable guides.

FIGS. 17 and 18 show additional alternative structures. A fully articulating rotor assembly employing a U-joint (universal joint) and an elastomeric dampener arrangement are shown in the exploded view of FIG. 17 to include a hub assembly 850 having a hub block 851 with radially extending rotor arm mounts 850A, 850B, and 850C. The hub block 851 is mounted on a drive shaft 852 with upper and lower U-joint halves 853A and 853B for rotation with the drive shaft 852 about a vertically extending rotational axis 854. The U-joint halves 853A and 853B combine with a cross connector 853C to enable fully articulating pivotal movement of the hub block 851 about first and second horizontally extending, orthogonal pivot axes 855 and 856. A sliding flange 857 is provided that is adapted to be manually adjusted in position axially along the drive shaft 852. It combines with a pressure flange 858 and an elastomeric O-ring to provide adjustable dampening action of pivotal hub-block movement about the pivot axes 855 and 856. For illustrative purposes, the elastomeric O-ring is shown in sections in the exploded view of FIG. 17 (i.e., as first and second O-ring sections 859A and 859B) whereas the O-ring is actually one piece. The hub block 851 and its upper and lower cover portions 851A and 851B are shown in FIG. 17 in multiple sections also, for illustrative purposes in order to expose the components within. The function of the O-ring can be accomplished instead by the repelling forces of strong magnets mounted in opposing pairs on flanges 857 and 858.

A VAWT fully articulating rotor assembly having a hub assembly 860 shown in FIG. 18 includes a hub block 861 and three radially extending rotor arms 860A, 860B, and 860C. The hub block 861 is mounted on a drive shaft 862 that drives a generator 863 as it rotates with the drive shaft 862 about a vertically extending rotational axis 864. The three rotor arms 860A, 860B, and 860C extend radially from the hub block 861 to three airfoils that may be similar to the airfoils of the VAWT 800 discussed above. For illustrative purposes, only inwardly disposed portions of the rotor arms 860A, 860B, and 860C are shown in FIG. 18 and the airfoils are not shown.

The hub block 861 is enclosed on top and opens downwardly. The rotor arms 860A, 860B, and 860C are streamlined and controls are mounted underneath them. Three push/pull cable mechanical linkages (just one mechanical linkage 865A is identified in FIG. 18) are routed though the three rotor arms and three downwardly protruding cable housings (just one housing 865B is identified) to a sliding push/pull cable adjustment ring 865C; the cable adjustment ring 865C is adapted to be manually adjusted in position axially along the drive shaft 862 for purposes of adjusting the mechanical linkages. Three dampeners (just one dampener 866A is identified in FIG. 18) extend from the three rotor arms to a sliding dampener adjustment ring 866B that is adapted to be manually adjusted in position axially along the drive shaft 862 for dampener adjustment purposes. Similar to the other fully articulating embodiments described above, the hub block 861 rotates with the drive shaft 862 about the rotational axis 864, wind-derived airfoil forces cause the hub block 861 to tilt and thereby cause the push/pull cable mechanical linkages to actively vary the pitch of the airfoils as the airfoils orbit the rotational axis 864.

Thus, the invention provides a mechanically-controlled-pitch VAWT having an articulating rotor system for mechanical control of airfoil angle-of-attack based directly on rotor tilt, using designs that might be said to relate more closely to the physics of two-bladed semi-rigid helicopter rotor systems than to prior art VAWT designs. The rotor is a component that is mounted on the support structure for rotation about the rotational axis where it supports one or more airfoils spaced radially from the rotational axis so that wind-derived airfoil forces produce both rotor rotation and rotor tilt. The rotor system is articulating in the sense that it can tilt and thereby enable upward and downward movement of the airfoils in response to forces produced by incoming wind (i.e., wind-derived airfoil forces); the rotor system can vary its orbital path to compensate for changes in wind energy and direction. The partially articulating rotor of one teetering-rotor embodiment seesaws up and down about a normal horizontally disposed position while the fully articulating rotor of another embodiment can tilt about any horizontal axis throughout 360-degrees of rotation, with rotor tilt causing mechanical linkages to actively vary airfoil pitch. Wobble and vibration are mitigated by the ability of the rotor system to vary its orbital path to compensate for changes in wind energy and direction. The system is self-starting, it is easily producible by conventional methods and materials, it can be configured to power any of various rotational loads, including electrical generators, water pumps, and the like, and it can accommodate a number of safety shut-down and airfoil-furling features. Although exemplary embodiments have been shown and described, one of ordinary skill in the art may make many changes, modifications, and substitutions without necessarily departing from the spirit and scope of the invention.

What is claimed is:

1. A wind engine, comprising:
   a support structure;
   a rotor mounted on the support structure for rotational movement about a vertically extending rotational axis and pivotal movement about a horizontally extending pivotal axis, said rotor including a plurality of mounting portions that are disposed radially from the rotational axis in circumferentially spaced apart positions about the rotational axis, and said plurality of mounting portions including at least a first mounting portion and a second mounting portion;
   first rotor-powering means responsive to oncoming wind for causing the rotor to rotate about the rotational axis and pivot about the pivotal axis, said first rotor-powering means including a first airfoil element mounted on the first mounting portion of the rotor, said first airfoil element having a first longitudinally extending axis that extends through the first mounting portion of the rotor;
   second rotor-powering means responsive to oncoming wind for causing the rotor to rotate about the rotational axis and pivot about the pivotal axis, said second rotor-powering means including a second airfoil element mounted on the second mounting portion of the rotor, said second airfoil element having a second longitudinally extending axis that extends through the second mounting portion of the rotor;
   first pitch-varying means for varying a pitch of the first airfoil element according to variations in the alignment of the first airfoil element with the oncoming wind as the first airfoil element orbits the rotational axis, said first pitch-varying means including a first mechanical linkage that couples the first airfoil element to the support structure; and
   second pitch-varying means for varying a pitch of the second airfoil element according to variations in the alignment of the second airfoil element with the oncoming wind as the second airfoil element orbits the rotational axis, said second pitch-varying means including a second mechanical linkage that couples the second airfoil element to the support structure;
   wherein the first longitudinally extending axis of the first airfoil element extends vertically from the first mounting portion of the rotor and the second longitudinally extending axis of the second airfoil element extends vertically from the second mounting portion of the rotor;
   wherein the first airfoil element is adapted to cause the rotor to pivot on the pivotal axis as the first airfoil element orbits the rotational axis so that the first mounting portion of the rotor and the first airfoil element move upwardly and downwardly together according to variations in the alignment of the first airfoil element with the oncoming wind; and
   wherein the first mechanical linkage is adapted to vary the pitch of the first airfoil element as the first airfoil element orbits the rotational axis in response to the first airfoil element moving upwardly and downwardly.

2. A wind engine as recited in claim 1, wherein:
   the second mounting portion is disposed radially outward from the rotational axis in a position diametrically opposite the first mounting portion.

3. A wind engine as recited in claim 1, wherein:
   the rotor includes a rotor axis that passes through the rotational axis and through the first and second mounting portions of the rotor;
   the first longitudinally extending axis of the first airfoil intersects the rotor axis at the first mounting portion of the rotor;
   the second longitudinally extending axis intersects the rotor axis at the second mounting portion of the rotor; and
   the first and second longitudinally extending axes diverge upwardly and converge downwardly.

4. A wind engine as recited in claim 1, wherein:
   the rotor includes a rotor axis that passes through the rotational axis and through the first and second mounting portions of the rotor;
   the first longitudinally extending axis of the first airfoil intersects the rotor axis at the first mounting portion of the rotor;
   the second longitudinally extending axis intersects the rotor axis at the second mounting portion of the rotor; and
   the first and second longitudinally extending axes converge upwardly and diverge downwardly.

5. A wind engine as recited in claim 1, wherein:
   the rotor includes a rotor axis that passes through the rotational axis and through the first mounting portion of the rotor;
   the first airfoil element includes a first longitudinally extending axis that intersects the rotor axis at the first mounting portion of the rotor; and
   the first longitudinally extending axis is not perpendicular to the rotor axis.

6. A wind engine as recited in claim 1, wherein:
   the wind engine includes means for spring biasing the rotor in a horizontally extending position of the rotor and for limiting pivotal motion of the rotor, said means including first and second springs that are connected to the support structure and to respective ones of the first and second mounting portions of the rotor.

7. A wind engine, comprising:
   a support structure;
   a rotor mounted on the support structure for rotational movement about a vertically extending rotational axis and pivotal movement about a horizontally extending pivotal axis, said rotor including a plurality of mounting portions that are disposed radially from the rotational axis in circumferentially spaced apart positions about the rotational axis, and said plurality of mounting portions including at least a first mounting portion and a second mounting portion;

first rotor-powering means responsive to oncoming wind for causing the rotor to rotate about the rotational axis and pivot about the pivotal axis, said first rotor-powering means including a first airfoil element mounted on the first mounting portion of the rotor, said first airfoil element having a first longitudinally extending axis that extends through the first mounting portion of the rotor; and first pitch-varying means for varying a pitch of the first airfoil element according to variations in the alignment of the first airfoil element with the oncoming wind as the first airfoil element orbits the rotational axis, said first pitch-varying means including a first mechanical linkage that couples the first airfoil element to the support structure;

wherein the first longitudinally extending axis of the first airfoil element extends vertically from the first mounting portion of the rotor;

wherein the first airfoil element is adapted to cause the rotor to pivot on the pivotal axis as the first airfoil element orbits the rotational axis so that the first mounting portion of the rotor and the first airfoil element move upwardly and downwardly together according to variations in the alignment of the first airfoil element with the oncoming wind;

wherein the first mechanical linkage is adapted to vary the pitch of the first airfoil element as the first airfoil element orbits the rotational axis in response to the first airfoil element moving upwardly and downwardly; and wherein the wind engine includes a counterbalancing weight mounted on the second mounting portion of the rotor.

8. A wind engine, comprising:

a support structure;

a rotor mounted on the support structure for rotational movement about a vertically extending rotational axis and pivotal movement about a horizontally extending pivotal axis, said rotor including first and second mounting portions disposed radially outward from the rotational axis in diametrically opposite positions relative to the rotational axis, and said rotor including a rotor axis that intersects the rotational axis and that passes through the first and second mounting portions;

rotor-powering means responsive to oncoming wind for causing the rotor to rotate about the rotational axis and pivot about the pivotal axis, said rotor-powering means including first and second airfoil elements mounted on respective ones of the first and second mounting portions of the rotor, the first airfoil element including a first longitudinally extending axis that intersects the rotor axis at the first mounting portion of the rotor and the second airfoil element including a second longitudinally extending axis that intersects the rotor axis at the second mounting portion of the rotor; and pitch-varying means for varying a pitch of the first airfoil element and a pitch of the second airfoil element according to variations in the alignments of the first and second airfoil elements with the oncoming wind as the first and second airfoil element orbit the rotational axis, said pitch-varying means including first and second mechanical linkages coupling respective ones of the first and second airfoil elements to the support structure;

wherein the first longitudinally extending axis of the first airfoil element extends vertically from the first mounting portion of the rotor and the second longitudinally extending axis of the second airfoil element extends vertically from the second mounting portion of the rotor;

wherein the first and second airfoil elements are adapted to cause the rotor to pivot on the pivotal axis as the first and second airfoil elements orbit the rotational axis so that the first and second mounting portions of the rotor move upwardly and downwardly with the first and second airfoil elements according to variations in the alignments of the first and second airfoil elements with the oncoming wind; and wherein the first and second mechanical linkages are adapted to vary the pitch of the first airfoil element and the pitch of the second airfoil element in response to the first and second airfoil elements moving upwardly and downwardly as the first and second airfoils orbit the rotational axis.

9. A wind engine as recited in claim 8, wherein the first and second longitudinally extending axes converge upwardly and diverge downwardly.

10. A wind engine as recited in claim 8, wherein the first and second longitudinally extending axes converge downwardly and diverge upwardly.

11. A wind engine as recited in claim 8, further comprising means for spring biasing the rotor in a horizontally extending position of the rotor and for limiting pivotal motion of the rotor, said means including first and second springs that are connected to the support structure and to respective ones of the first and second mounting portions of the rotor.

12. A wind engine, comprising:

a support structure;

a rotor mounted on the support structure for rotational movement about a vertically extending rotational axis, said rotor including a plurality of mounting portions disposed radially outward from the rotational axis in circumferentially spaced apart positions about the rotational axis, said plurality of mounting portions including at least a first mounting portion and a second mounting portion; and rotor-powering means responsive to oncoming wind for causing the rotor to rotate about the rotational axis, including at least a first airfoil on the rotor having a first longitudinally extending axis and a second airfoil on the rotor having a second longitudinally extending axis;

wherein the first airfoil is mounted on the first mounting portion of the rotor with the first longitudinally extending vertically and the second airfoil is mounted on the second mounting portion of the rotor with the second longitudinally extending axis extending vertically;

wherein the rotor is mounted on the support structure in a manner enabling tilting movement of the rotor in response to wind-derived airfoil forces; and wherein the wind engine includes first pitch-varying means for varying a pitch of the first airfoil in response to tilting movement of the rotor and second pitch-varying means for varying a pitch of the second airfoil in response to tilting movement of the rotor.

13. A wind engine as recited in claim 12, wherein the rotor is mounted on the support structure with a gimbal assembly providing 360-degree articulation of the rotor.

14. A wind engine as recited in claim 12, wherein the rotor-powering means includes at least three airfoils mounted on the rotor.

15. A wind engine as recited in claim 14, wherein the three airfoils converge upwardly and diverge downwardly.

16. A wind engine as recited in claim 14, wherein the three airfoils converge downwardly and diverge upwardly.

17. A wind engine as recited in claim 12, wherein the pitch-varying means includes a first mechanical linkage that couples the first airfoil to the support structure.

18. A wind engine as recited in claim 12, wherein the rotor is mounted on the support structure in a manner enabling only partial articulation of the rotor for rotor-tilting purposes.

19. A wind engine as recited in claim 12, wherein the rotor is mounted on the support structure for rotational movement about a vertically extending rotational axis and pivotal movement about a horizontally extending pivotal axis.

20. A wind engine as recited in claim 19, wherein:

the rotor includes at least a first mounting portion disposed radially outward from the rotational axis;

the rotor-powering means includes a first airfoil mounted on the first mounting portion of the rotor;

the first pitch-varying means is adapted to vary a pitch of the first airfoil according to variations in the alignment of the first airfoil with the oncoming wind as the first airfoil orbits the rotational axis, said first pitch-varying means including a first mechanical linkage that couples the first airfoil to the support structure;

the first airfoil is adapted to cause the rotor to pivot on the pivotal axis as the first airfoil orbits the rotational axis so that the first mounting portion of the rotor and the first airfoil move upwardly and downwardly together according to variations in the alignment of the first airfoil with the oncoming wind; and wherein the first mechanical linkage is adapted to vary the pitch of the first airfoil as the first airfoil orbits the rotational axis in response to the first airfoil moving upwardly and downwardly.

21. A wind engine, comprising:

a support structure;

a rotor mounted on the support structure for rotational movement about a vertically extending rotational axis; and rotor-powering means responsive to oncoming wind for causing the rotor to rotate about the rotational axis, including at least a first airfoil on the rotor;

wherein the rotor is mounted on the support structure in a manner enabling tilting movement of the rotor in response to wind-derived airfoil forces;

wherein the wind engine includes pitch-varying means for varying a pitch of the first airfoil in response to tilting movement of the rotor; and wherein the rotor is mounted on the support structure with a gimbal assembly providing 360-degree articulation.

22. A wind engine, comprising:

a support structure;

a rotor mounted on the support structure for rotational movement about a vertically extending rotational axis; and rotor-powering means responsive to oncoming wind for causing the rotor to rotate about the rotational axis, including at least a first airfoil on the rotor;

wherein the rotor is mounted on the support structure in a manner enabling tilting movement of the rotor in response to wind-derived airfoil forces;

wherein the wind engine includes pitch-varying means for varying a pitch of the first airfoil in response to tilting movement of the rotor; and wherein the rotor-powering means includes at least three airfoils mounted on the rotor;

said wind engine further comprising means for repositioning the airfoils relative to the rotor during periods of time in which the rotor is not rotating about the rotational axis in order to thereby lessen airfoil exposure to wind damage.

\* \* \* \* \*